US011457013B2

(12) United States Patent
Logan

(10) Patent No.: US 11,457,013 B2
(45) Date of Patent: *Sep. 27, 2022

(54) CORRECTIONAL POSTAL MAIL CONTRABAND ELIMINATION SYSTEM

(71) Applicant: HLFIP HOLDING, INC., Placida, FL (US)

(72) Inventor: Jonathan D. Logan, Tampa, FL (US)

(73) Assignee: HLFiP HOLDING, INC., Placida, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,084

(22) Filed: May 10, 2019

(65) Prior Publication Data

US 2020/0128014 A1 Apr. 23, 2020

Related U.S. Application Data

(63) Continuation of application No. 15/153,171, filed on May 12, 2016, now Pat. No. 10,291,617.

(60) Provisional application No. 62/286,046, filed on Jan. 22, 2016, provisional application No. 62/160,054, filed on May 12, 2015.

(51) Int. Cl.
| | |
|---|---|
| *G06K 15/00* | (2006.01) |
| *H04L 9/40* | (2022.01) |
| *H04L 51/08* | (2022.01) |
| *G06V 30/40* | (2022.01) |
| *G06V 30/148* | (2022.01) |
| *H04L 51/212* | (2022.01) |

(52) U.S. Cl.
CPC ............ *H04L 63/10* (2013.01); *G06V 30/153* (2022.01); *G06V 30/40* (2022.01); *H04L 51/08* (2013.01); *H04L 51/212* (2022.05); *H04L 63/0245* (2013.01)

(58) Field of Classification Search
CPC ..... H04L 63/10; H04L 63/0245; H04L 51/12; H04L 51/08; G06K 9/00442; G06K 9/344
USPC .......................................................... 726/4
See application file for complete search history.

(56) References Cited

U.S. PATENT DOCUMENTS

| | | | |
|---|---|---|---|
| 5,917,925 A | 6/1999 | Moore | |
| 6,285,777 B2 | 9/2001 | Kanevsky et al. | |

(Continued)

OTHER PUBLICATIONS

6 Services to Send and Receive Snail Mail Through the Web; http://www.instantfundas.com/2008/04/6-services-to-send-and-receive-snail.html 12/3112008.

(Continued)

*Primary Examiner* — Jeffrey C Pwu
*Assistant Examiner* — Nega Woldemariam
(74) *Attorney, Agent, or Firm* — Shah IP Law, PLLC

(57) ABSTRACT

A method and system for eliminating contraband in postal mail at a correctional facility comprising a central processing facility and a network of inmate email kiosks and correctional institution staff review stations. The postal mail utilizes scanning stations to create electronic versions of the mail and associates various information about the sender, recipient, mail contents, and institution into a format that is easily reviewable and provides tracking data. The scanned mail may then be made available to the intended inmate and institution staff. Institution staff may also then access the associated information and tracking data.

32 Claims, 18 Drawing Sheets

(56) References Cited

U.S. PATENT DOCUMENTS

| | | | |
|---|---|---|---|
| 6,463,127 B1 | 10/2002 | Maier et al. | |
| 6,513,003 B1 | 1/2003 | Angell et al. | |
| 6,609,196 B1 | 8/2003 | Dickinson, III et al. | |
| 6,668,045 B1 | 12/2003 | Mow | |
| 7,161,108 B2 | 1/2007 | O'Connell et al. | |
| 7,502,451 B2 | 3/2009 | Gyllenskog et al. | |
| 7,693,942 B2 | 4/2010 | Nale | |
| 7,742,581 B2 | 6/2010 | Hodge et al. | |
| 7,804,941 B2 | 9/2010 | Keiser et al. | |
| 8,204,177 B2 | 6/2012 | Harper | |
| 8,331,677 B2 | 12/2012 | Foehr et al. | |
| 8,588,528 B2 | 11/2013 | Chapman et al. | |
| 8,676,273 B1 | 3/2014 | Fujisaki | |
| 9,178,862 B1 | 11/2015 | Daniel | |
| 9,311,627 B1 | 4/2016 | Shipman, Jr. et al. | |
| 9,525,656 B2 | 12/2016 | Harper | |
| 9,742,935 B1 | 8/2017 | Shipman, Jr. et al. | |
| 2002/0056123 A1 | 5/2002 | Liwerant et al. | |
| 2003/0072469 A1 | 4/2003 | Alden | |
| 2003/0074477 A1 | 4/2003 | Fukushima et al. | |
| 2003/0177115 A1 | 9/2003 | Stern et al. | |
| 2005/0018214 A1 | 1/2005 | Dewitt et al. | |
| 2006/0031086 A1 | 2/2006 | Miles et al. | |
| 2006/0184544 A1* | 8/2006 | Harper | H04L 67/306 |
| 2006/0218188 A1 | 9/2006 | Duncan et al. | |
| 2006/0245559 A1 | 11/2006 | Hodge et al. | |
| 2007/0226088 A1 | 9/2007 | Miles et al. | |
| 2007/0233610 A1 | 10/2007 | Gyllenskog et al. | |
| 2008/0040781 A1* | 2/2008 | Keiser | H04L 51/066 |
| | | | 726/5 |
| 2009/0052804 A1 | 2/2009 | Lewis | |
| 2009/0282009 A1 | 11/2009 | Levey et al. | |
| 2010/0299761 A1 | 11/2010 | Shapiro | |
| 2011/0119730 A1 | 5/2011 | Eldar et al. | |
| 2012/0266219 A1 | 10/2012 | Coleman et al. | |
| 2013/0179949 A1 | 7/2013 | Shapiro | |
| 2013/0226678 A1 | 8/2013 | Perna | |
| 2013/0246158 A1 | 9/2013 | Cannon et al. | |
| 2014/0006148 A1 | 1/2014 | Perna | |
| 2014/0136628 A1 | 5/2014 | Davis, Jr. et al. | |
| 2014/0229558 A1 | 8/2014 | Ricci | |
| 2015/0172292 A1 | 6/2015 | Kuang et al. | |
| 2015/0215254 A1 | 7/2015 | Bennett | |
| 2015/0373031 A1 | 12/2015 | Hockings et al. | |
| 2016/0337360 A1 | 11/2016 | Logan | |

OTHER PUBLICATIONS

Armstrong et al., Digital System, Evidence and Forensics Issues in Correctional Environments, 2010 IEEE, 9 pages (Year: 2010).
Bisson et al., Methods for the Prevention of the Use of Mobile Phones in Correctional Institutions, 2012 Crown, 9 pages (Year:2012).
Dhanalakshmi etal., An Intelligent Technique to Detect File Formats and Email Spam, 2010 India, 6 pages (Year: 2010).
Finland postal service to open mail and send scanned email copies, Telegraph Media Group Limited 2019, https://www.telegraph.co.uk/news/worldnews/europe/finland/7545709/Finland-postal-service-to--Open-mail-and-send-scanned-mail-copies.html, UK.
Gregory Gearhart, Controlling Contraband, 2006 CT Feature, 3 pages (Year: 2006).
Mailbox Forwarding—View Postal Mail Online, Mail Forwarding, Mailbox Rental, and Virtual Office PO Box Services, Feb. 26, 2019, https://www.smartjailmail.com/, SmartJailMail.com.
Micheal L. Stern, Prison Mail Censorship: A Non-constitutional Analysis, 1972 HeinOnline, 47 pages (Year: 1972).
DI046; [Proposed] Order Granting Defendants' Motion for Judgment on the Pleadings of Invalidity Under 35 U.S.C. § 101, 4 pages.
DI047; Brief in Support of Motion for Judgment on the Pleadings of Invalidity Under 35 U.S.C. § 101; 158 pages.
DI055; Plaintiff's Brief in Opposition of Defendants' Motion for Judgment on the Pleadings of Invalidity Under 35 U.S.C. § 101, 29 pages.
DI058; Reply Brief in Support of Motion for Judgment on the Pleadings of Invalidity Under 35 U.S.C. § 101, 23 pages.
DI089, Plaintiff's Opening Claim Construction Breif, 1067 pages.
DI090, Defendants' Response to Plaintiff's Opening Claim Construction Brief, 375 pages.
DI095, Plaintiff's Reply to Defendants' Response to Plaintiff's Opening Claim Construction Brief, 58 pages.
DI095-1, Exhibit 1—Tinsman Deposition Excerpts, 106 pages.
DI099, Plaintiff's Motion to Exclude the Testimony of John Tinsman, 4 pages.
DI100, Memoranum in Support of Plaintiff's Motion to Exclude the Testimony of John Tinsman, 24 pages.
DI100-1, Exhibit A Depo Transcript, 44 pages.
"Fiftieth Anniversary of First Digital Image Marked," NIST, May 24, 2007, Retrieved from the Internet on May 17, 2022: https://www.nist.gov/news-events/news/2007/05/fiftieth-anniversary-first-digital-image-marked, 1 Page.
U.S. Department of Justice Federal Bureau of Prisons, "Mail Management Manual," Apr. 5, 2011, pp. 1-41.
"The United States Postal Service: An American History," United States Postal Service, Publication 100, 2020, ISBN 978-0-9630952-4-4, pp. 1-149.
DI 135, Memorandum in Support of Defendants' Motion filed Apr. 25, 2022, pp. 1-25.
"Why Every Business Needs OCR," Foxit, Aug. 26, 2013, Retrieved from the Internet on May 17, 2022: https://www.foxit.com/blog/why-every-business-needs-ocr/, pp. 1-3.
DI 130, Order granting Defendants' motion for leave, filed Apr. 14, 2022, pp. 1-14.
DI 136, Order on Defendants' motion filed Apr. 14, 2022, Apr. 25, 2022, 1 Page.
DI 131, Second Amended Answer, Affirmative Defenses, and Counterclaims of Defendants' York County, Pennsylvania; York County Prison; and Adam Ogle filed Apr. 14, 2022, pp. 1-175.

* cited by examiner

Step 2 – Select or Enter Sender

To: CHRISTINA BAILEY (852285) at FL-Martin County Jail

Select the sender from the inmate's contacts below or enter the sender name, company name, etc. or enter "unknown" if sender is not available.

| Name | Location | Gender |
|---|---|---|
| RULEY, GEORGE | Sarasota, FL 34241 | Male |

Sender Name: [        ]

[ Proceed... ]

FIG. 7

Step 3 – Scan Mail

To: CHRISTINA BAILEY (352285) at FL-Martin County Jail

Please verify that the inmate information above is correct before proceeding. If the information matches the mail recipient please proceed with the scanning process. Once the scan is complete, click "refresh" below to show the scan file.

Scanned File

📄 EF39C21D-B679-A62D-7499F8CBE6C6DF8D.pdf

Preview Scan...

Postal Mail Addresses

This facility is now processing postal mail through a Mail Processing Center. Regular postal mail will be received at an off-site facility, scanned into an electronic format, and then delivered to you through this kiosk. Privileged mail from attorneys and larger parcels such as books, magazines, or other approved materials can be sent directly to the jail at the address below. All other mail should be sent to the Smart Communications Mail Processing Center. Regular postal mail received at the facility will be rejected and returned.

Privileged Attorney Correspondence

NOTE: Privileged mail from your attorney must be clearly marked as such.

> Sample County Jail
> ATTN: Jacket #12345
> 321 County Rd.
> Somewheresville, FL 34241

Books, Magazines, and Other Approved Parcels (See Inmate Handbook)

> Sample County Jail
> ATTN: Jacket #12345
> 321 County Rd.
> Somewheresville, FL 34241

All Other Mail, Personal Mail, Postcards, Letters, etc.

> Inmate Name #12345
> c/o Mail Processing Center
> 5406 Airport Rd.
> Tampa, FL 33609

Return to My Postal Mail

CORRECTIONAL POSTAL MAIL CONTRABAND ELIMINATION SYSTEM

This continuing application claims priority to prior U.S. Non-provisional application Ser. No. 15/153,171, filed on May 12, 2016, U.S. Provisional Application No. 62/286,046, filed on Jan. 22, 2016, and U.S. Provisional Application No. 62/160,054, filed on Mar. 12, 2015, each of which is hereby incorporated by reference in its entirety.

FIELD OF THE INVENTION

The presently disclosed invention relates in general to the field of postal mail delivery, and in particular, to a system and method for providing copies of postal mail to individuals incarcerated in a correctional facility in a safe manner in order to ensure the elimination of any contraband and reduce administrative costs for the correctional facility.

BACKGROUND

Methods for the delivery of postal mail and electronic mail to inmates are known in the art. Procedures or methods for dispensing mail via traditional postal systems have been described in U.S. Pat. No. 5,917,925. Systems for using electronic messaging in institutions. such as prisons, have been described in U.S. Pat. No. 7,502,451. Such publications are incorporated herein by reference. Such procedures, however, do not adequately address the conversion of postal mail to electronic mail for the elimination of any contraband being delivered to prison inmates. Embodiments of the presently disclosed invention address such limitations, infer alia, by providing an improved system and method for the elimination of contraband in correctional postal mail via the delivery of electronic copies of such postal mail.

SUMMARY

The present invention provides a system and method for eliminating contraband in postal mail for a correctional facility. Staff at a central facility may receive postal mail for inmates. Upon receipt of the mail, the postal mail may be reviewed for information. Such information may be addressee or recipient inmate information, sender information, institution information, or any other information discoverable upon review or analysis of the postal mail. Additionally, upon receipt of the postal mail, an analysis or screening of the mail for contraband may optionally be performed. Once information is retrieved from the mail, the information may be associated with the intended recipient inmate, such as through an inmate email account. The postal mail may then be scanned to create an electronic copy. The electronic copy may be stored, such as on a server which may be accessed over a network. The electronic copy may include any and all information obtained from the postal mail and additional information such as whether contraband was found in the postal mail. Other tracking data, such as how many times a specific sender has sent mail to a specific inmate may also be associated with the electronic copy, such as through a log or database.

Once the electronic record of the postal mail, which may include the electronic copy and any associated information, is stored on a server, the electronic record may be viewed by institution staff. Upon review, the staff may determine if the electronic copy of the postal mail may be accessed by the intended recipient inmate. If access is permitted, the electronic record may be made available to the intended recipient inmate via an email kiosk, which may be a fixe(t or a portable device. Additional information may be associated with the electronic record, such as date and time of each access by the inmate or institution staff.

BRIEF DESCRIPTION OF THE DRAWINGS

The foregoing and other objects, features, and advantages of the invention will be apparent from the following more particular description of embodiments as illustrated in the accompanying drawings. in which reference characters refer to the same parts throughout the various views. The drawings are not necessarily to scale, emphasis instead being placed upon illustrating principles of the invention.

FIG. 7 illustrates a display that may conveniently be used in connection with steps illustrated in FIG. 4 and suitable for use in with certain embodiments of methods and systems according to the present invention;

FIG. 9 illustrates a display that may conveniently be used in connection with steps illustrated in FIG. 4 and suitable for use in with certain embodiments of methods and systems according to the present invention;

FIG. 10 depicts a scanned item of postal mail that may conveniently be displayed in connection with steps illustrated in FIG. 4 and suitable for use in with certain embodiments of methods and systems according to the present invention;

FIG. 14 illustrates a second display that may conveniently be used by inmates in a correctional facility and suitable for use in with certain embodiments of methods and systems according to the present invention;

FIG. 16 illustrates a display that may conveniently be used by staff in a correctional facility or investigators and suitable for use in with certain embodiments of methods and systems according to the present invention;

FIG. 17 illustrates a second display that may conveniently be used by staff in a correctional institution or investigators and suitable for use in with certain embodiments of methods and systems according to the present invention;

DETAILED DESCRIPTION OF THE EMBODIMENTS

Reference will now be made in detail to the embodiments of the presently disclosed invention, features of which are illustrated in the accompanying drawings.

Postal mail is a federal right to U.S. citizens incarcerated in a correctional agency within the United States. Traditionally, postal mail sent to an incarcerated individual is searched by hand and may be scanned through a contraband detection machine to detect for drugs, weapons, chemicals, and poison, and then hand delivered to the inmate. Stamps and stickers may also be removed as a further security measure. Either the inspected mail or a photocopy (for added security) is then delivered by facility personnel to the inmate. In some correctional agencies, postal mail sent to the facility is limited to only postcards in an effort to reduce administrative cost and handling time.

Figure 1:
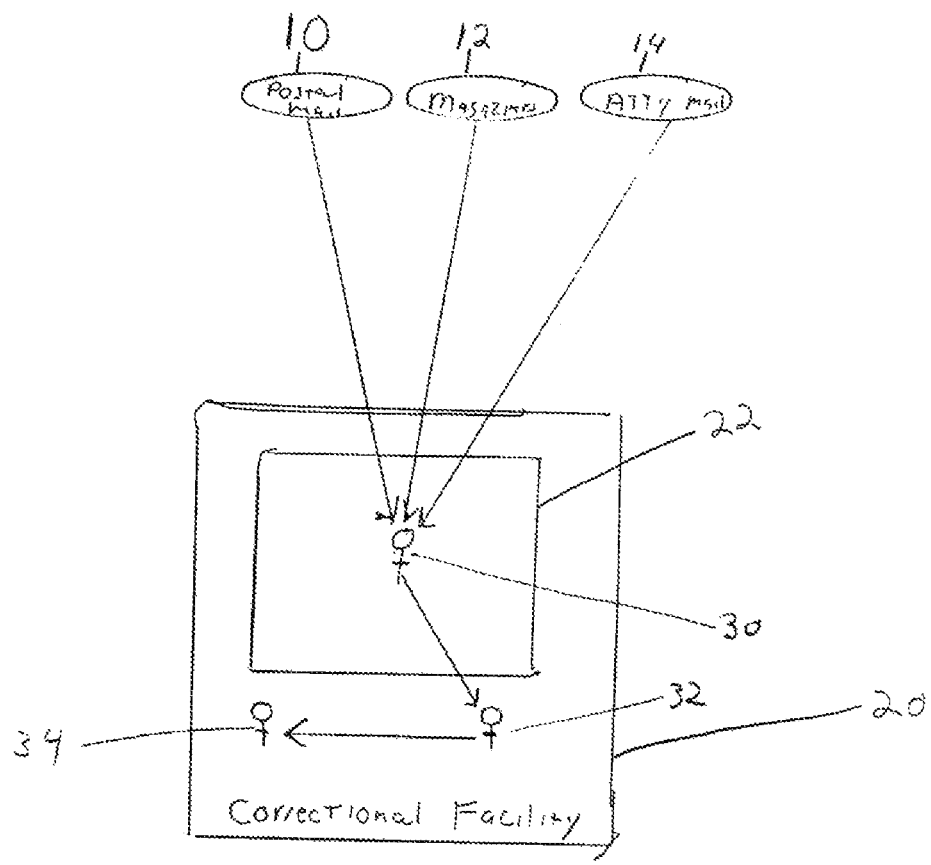
FIG. 1 illustrates a block diagram of the manual method of delivering postal mail to inmates in a correctional institution.

This manual process for processing postal mail is illustrated in FIG. 1 magazines 12, Attorney Mail 14, and other Postal Mail 10 (jointly "mail") are received at correctional facility 20, and sent to an in-facility manual mail processing center 22 Facility mail processing staff 30 then review and process the mail to verify recipient inmates, identify contraband and illicit content, etc. Such contraband or illicit content may include pornography, dangerous objects or criminal communication. Reviewed mail determined to be appropriate for delivery is then delivered to recipient inmates 34 by facility delivery staff 32 (which may or may not be the same persons as facility mail processing staff 30).

Postal mail contraband sent to correctional facilities is a daily problem and security risk that every correctional agency must combat. Many manual processes such as those described in connection with FIG. 1 have been used to reduce the chances of contraband reaching the recipient inmates. These processes are labor intensive, expensive and time consuming for the staff of the correctional facility and they delay mail delivery to the recipient. Although these steps help reduce the problem of the transmittal of contraband, they do not entirely eliminate contraband. Common practice to combat contraband in the postal mail including: hand searching each piece of mail; testing or scanning mail for drugs, chemicals, and poison; removing stamps, photos, and stickers; and making photocopies of mail to be hand delivered to an inmate instead of the original item that was mailed to facility.

One objective of the presently disclosed system and method is an application in which such problems are reduced by, where possible, delivering electronic copies to inmates as opposed to physical copies. In such an embodiment, contraband cannot reach the inmate because an electronic copy is made of the postal mail and that electronic copy transmitted to the inmate for viewing on a kiosk or portable device. The possibility of any contraband reaching the inmate is thereby eliminated for all practical purposes. In addition, because physical copies are not provided to the inmate. the processing required when postal mail 10 is received (such as removing stamps or analyzing for substances incorporated into the paper) can be reduced. A further benefit is that an electronic form of the postal mail is delivered electronically to the inmate without the correctional institution staff having to hand deliver the mail. Accordingly, in addition to reducing contraband risk. certain embodiments may include the benefits of reducing manual labor, reducing staff and inmate interaction. and reducing foot traffic inside the facility, all of which can be benefits in a correctional environment.

Furthermore, often with postal mail, there is no record of the piece of mail once it has been delivered to the inmate, unless a copy was made and saved by the prison's staff. Where copies are made, such copies are most often physical copies and are hard to search or for outside investigators to access. In certain embodiments of the present invention security is enhanced because every piece of postal mail 10 can be documented, saved electronically and in many cases, made searchable for further review by prison staff and detectives, and may be linked to the specific inmate to whom the postal mail was addressed. Further, additional information, such as sender information, may be associated with the with the electronically saved mail. Specific sender information may then be linked or associated with individual inmates or groups of inmates. The association of sender information with specific inmates may allow for the discovery of trends or patterns of mail delivery to specific inmates, or by specific senders, or even to specific institutions or groups of institutions. Mail may thus be reviewed under an inmate's postal mail history on the system, in accordance with some embodiments. Mail items may be also reviewed under a sender's postal mail history on the system, in accordance with some embodiments.

It will also be understood that, when physical mail is to be delivered, the delivery is most often to the facility where the inmate is housed. This means that each such facility must separately implement the receiving and distribution procedures discussed above, often using institution staff that have other important responsibilities. Embodiments of the present invention allow multiple facilities to receive postal mail at a central location, thereby offering further opportunities for cost savings and security enhancement. Only magazines 12 and attorney mail 14 need to be physically delivered to the facility. Magazines 12 and attorney mail 14 typically require less processing, in part, because they are sent to the inmate by third parties other than friends, business associates and family members. and who are unlikely to attempt to deliver contraband to the inmate. The result is that only a smaller amount of comparatively low-risk mail need be processed by the institution staff, with the higher-volume, higher-risk postal mail 10 being processed by a centralized receiving center.

As is noted above, an advantage of some embodiments for the present invention may be a practically complete elimination of contraband in postal mail for the corrections industry. Another benefit may be a system embodiment that delivers postal mail to inmates electronically, without staff having to hand deliver postal mail. A further benefit may be improved record keeping. Certain embodiments may thus improve agency security, reduce manual labor, and increase postal mail efficiency in correctional agencies.

While an inmate email system for inmates housed by correctional agencies can provide inmates a contraband-free written communication alternative to postal mail. such email systems do not combat contraband in postal mail. Even if email systems are provided, postal mail must also be allowed as a federal right to inmates. The introduction of email systems may have helped reduce postal mail volume being sent to correctional agencies, allowing the agency to focus on a smaller volume of postal mail that does come into the facility. However. email systems have not replaced postal mail and have not otherwise directly impacted postal mail handling. Conventional email systems were merely introduced as an alternative to postal mail and were not meant to stop contraband in postal mail. Postal mail is thus still reaching inmates and still creates contraband issues for facilities. Because contraband is being sent in that postal mail, it is impossible to completely eliminate contraband reaching the inmate because not all of the transmitted contraband can be detected (for example, lacing letters with drugs or poison. or finding previously undiscovered ways of hiding hard-to-detect weapons in postal mail). Even with the current methods and technology in place, some mail with contraband may still pass through detection by both humans and technology.

In correctional facilities—inmate communications with the outside world are intentionally limited. Postal mail is the oldest form of communication in the corrections industry. Contraband being sent through postal mail has thus been a problem since the beginning of corrections hundreds of years ago, yet the same basic process is still used today, and federal law has created a right for inmates to receive postal mail. Postal mail is sent into a correctional facility, and even though some inspection processes are in place, that postal mail traditionally gets hand delivered to the inmate the same way it was hundreds of years ago. Since the ability to receive postal mail is required by law and the corrections environment promotes limited controlled communication, any change as to how postal mail reaches inmates has been discouraged. As payment for the postal mail has already been made to the postal service, there has been no financial incentive for anyone to invest money or technology to improve the way inmates received their postal mail.

In order for inmates to be able to receive electronic copies of their postal mail, an investment is required to implement embodiments of the presently disclosed system and method. Since inmates may not be charged additional money for delivery of postal mail over and above the postal service fee, there has been no financial incentive for facility to invest this capital. The labor cost savings and the benefit of essentially eliminating the chance of any contraband reaching inmates through the mail, can justify an investment and can also result in further advantages such as reducing the carbon footprint of mail improving security throughout the country, reducing recidivism, lowering the cost of incarceration per inmate, and lowering the burden on tax payers across the country-Costs may still be seen as prohibitive if it is necessary to implement an electronic infrastructure to deliver scanned mail to inmates. However in facilities where kiosks or portable devices are already in use by inmates for the purpose of providing other paid services (for example email or video visitation), the cost of implementing embodiments of the present invention are reduced and may also be offset by other revenue streams for the facility, resulting from other services delivered through such devices. In certain embodiments of methods according to the present disclosure, processing of postal mail 10 by a third-panty facility may be at little or no cost to the facility by a third-party kiosk or email vendor.

Figure 2:
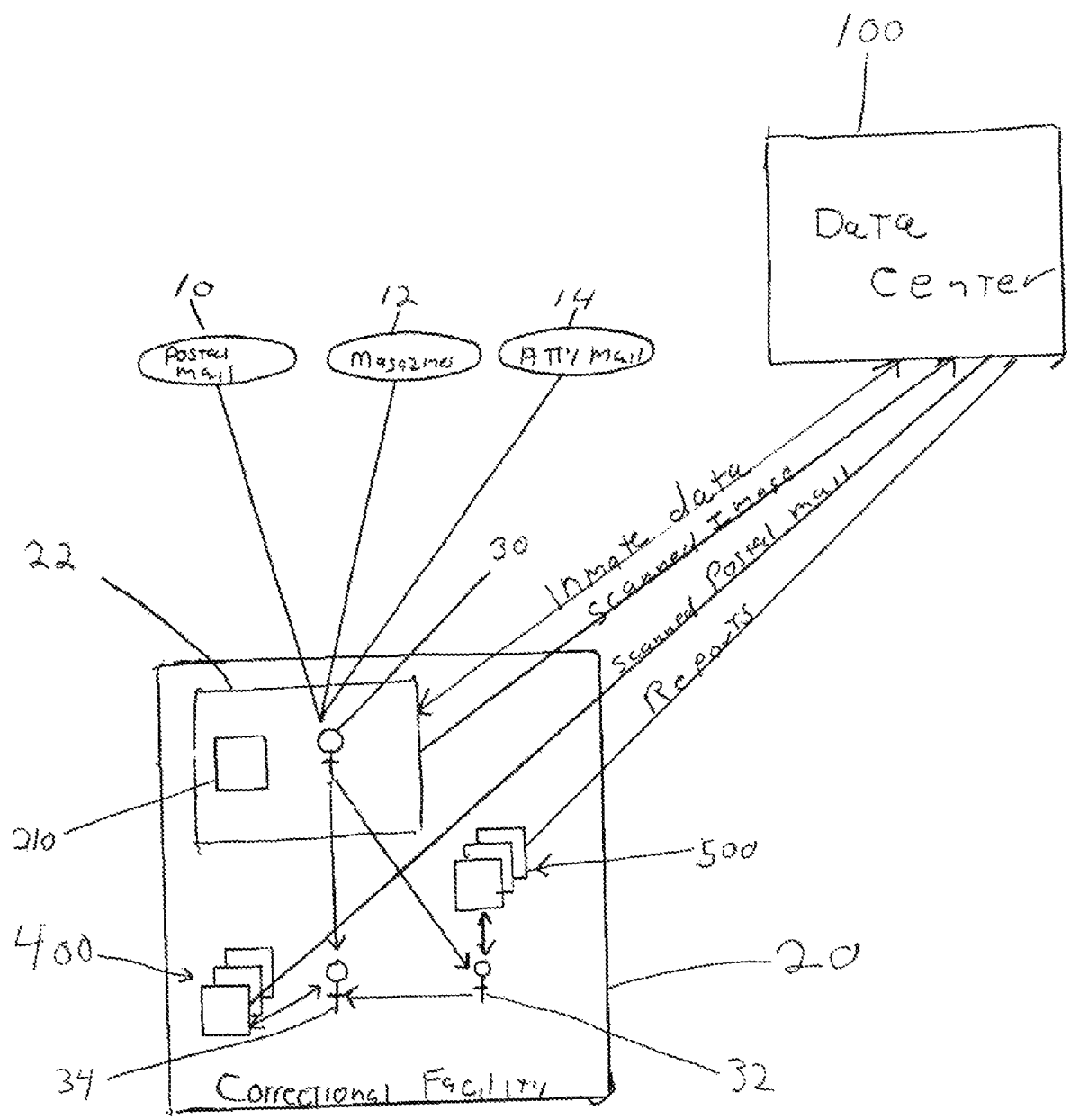
FIG. 2 illustrates a block diagram of an embodiment of a method and system, in accordance with certain embodiments of the invention, in which postal mail processing occurs within a correctional facility.

Embodiments of the presently disclosed invention thus enable postal mail that is sent to correctional facilities to be reduced to an electronic copy and delivered to the inmate electronically, thereby essentially eliminating the chance that mailed contraband will reach the inmate. FIG. 2 illustrates an embodiment according to the present disclosure that is implemented within a correctional facility 20. but using a remote or cloud-based data center 100. The postal mail 10 is received into in-facility manual mail processing center 200. Comparatively lower-risk magazines I '2and attorney mail 14 are processed and delivered by manual delivery. For other postal mail 103 the contents and the envelope may be loaded into a scanner station 210. In some alternative embodiments, where some institutions may only allow post cards to be sent to inmates, the post cards may be loaded into a scanner station. Scanner station 210 may comprise a computer or portable device connected to a scanner, or a camera, and capable of creating an electronic image of the postal mail 10, thereby reducing the postal mail to an electronic form. In some embodiments, the electronic form may come in multiple parts. For example, an envelope may be scanned thereby capturing the sender information and the recipient inmate information. The contents of the envelope may then be scanned capturing the content information. The recipient inmate information may be used to associate the electronic image or version to an inmate email account or other inmate designation. Additionally, this information may be logged or stored. Additional information such as the date received, date scanned, or other related information may logged as well. High speed scanning technology may be used for high volume applications. The scanned image may be uploaded into a software system, and the software system may prompt the user (e.g. correctional agency staff) either before or after the scanning is performed for the inmate's identification. This may be the inmate's prison number, the inmate's name, or some other unique identifier. The inmate identifier may be entered by the facility staff 32 (e.g., by selection from a presented list), and the software system may then retrieve the inmate's account based on the identifier that was entered into the system. The staff or user may then confirm that the postal mail. in electronic form. has been sent to the correct inmate identified in the software system which may conveniently be implemented in a local, remote, or cloud-based data center 100. The staff may also enter the postal mail sender information. In certain embodiments, redaction of obscene material may also be performed at this stage either electronically or prior to scanning. After scanning, the original may either be stored or destroyed according to the policies of the correctional facility 20 and any legal requirements.

Magazines 12 and attorney mail 14, which must be delivered to inmates 34 in physical form, (after any required processing or logging) are provided to other institution staff 32 for deliver to inmate 34. Postal mail 10, however, is delivered to inmates 34 through computer terminal 4003 which may conveniently be a kiosk, such as is used to deliver email to inmates, a portable device such as a tablet or MP4 player, or a worn device used by inmates, or any other electronic device with a display capability and a network connection capability, by the system in data center 100. Where other institution staff 32 need to monitor electronically delivered postal mail for investigative or other appropriate reasons, workstations, computers, portable devices 500 can access an institution staff interface implemented by the system hosted in data center 100.

Other intermediate steps may also take place in certain embodiments. In certain embodiments, once the mail processing staff 30 confirms the correct inmate as the recipient of the particular postal mail 103 and the staff submits the electronic form of the postal mail to the inmate's account. an electronic copy of the postal mail may be delivered electronically to the inmate's postal mail account via a computer terminal 400 (e.g. a kiosk within the correctional facility) wired or wireless, or via a computer terminal (not illustrated) located inside the inmate's housing unit or on a wireless mobile device (e.g. a handheld tablet, smartphone, laptop, MP4 player, or wom device) not illustrated. The inmate may log into his or her account by access through the above mentioned devices in order to view the electronic copy of the postal mail 10, or may download a copy on a mobile device in order to view it, in the same manner that inmate email is delivered today, such as through an inmate email account, except that the delivery may be an image of the original (in a format such as PDF) instead of a text-only message. Optical character recognition of the scanned message (either as part of scanning or later) may be used to make the images text-searchable by institution staff, investigators or inmate* depending on the needs of the facility. Where handwriting is not susceptible to optical character recognition manual transcription may be used either before or after the scanned image is made available to inmate 34.

Ail postal mail 10 may be memorialized in the system for each inmate, in accordance with certain embodiments. Mail processing staff 30 may upload and hold postal mail for review before it is released and thereby made accessible to the inmate. The staff 30 may reject postal mail so the inmate cannot view the postal mail even after it has been uploaded to the system. In some embodiments, the processing staff 30 and institution staff 32 may review, search, print, forward, add notes, flag, delete, each postal mail that has been uploaded to the system for each inmates account. Whereas attorney mail 14 may be delivered in physical form. without review by processing staff 30 or institution staff 32 to preserve confidentiality. other procedures may also be put in place for communications from legal counsel to ensure such communications remain private such as automated opening and scanning and flagging of the messages so that staff cannot access the images of them. Additionally, the electronic copies of certain postal mail may be flagged based on sender information or the discovery of contraband. For example, if a specific sender has repeatedly sent postal mail which contained contraband, any postal mail from that sender may be indicated for review by a flagging of the scanned copies. It is understood that a correctional institution may desire to flag scanned version of postal mail for any number of reasons to further tracking, investigation and review and all of these reasons are considered within the scope of the exemplary embodiments disclosed.

Figure 3:
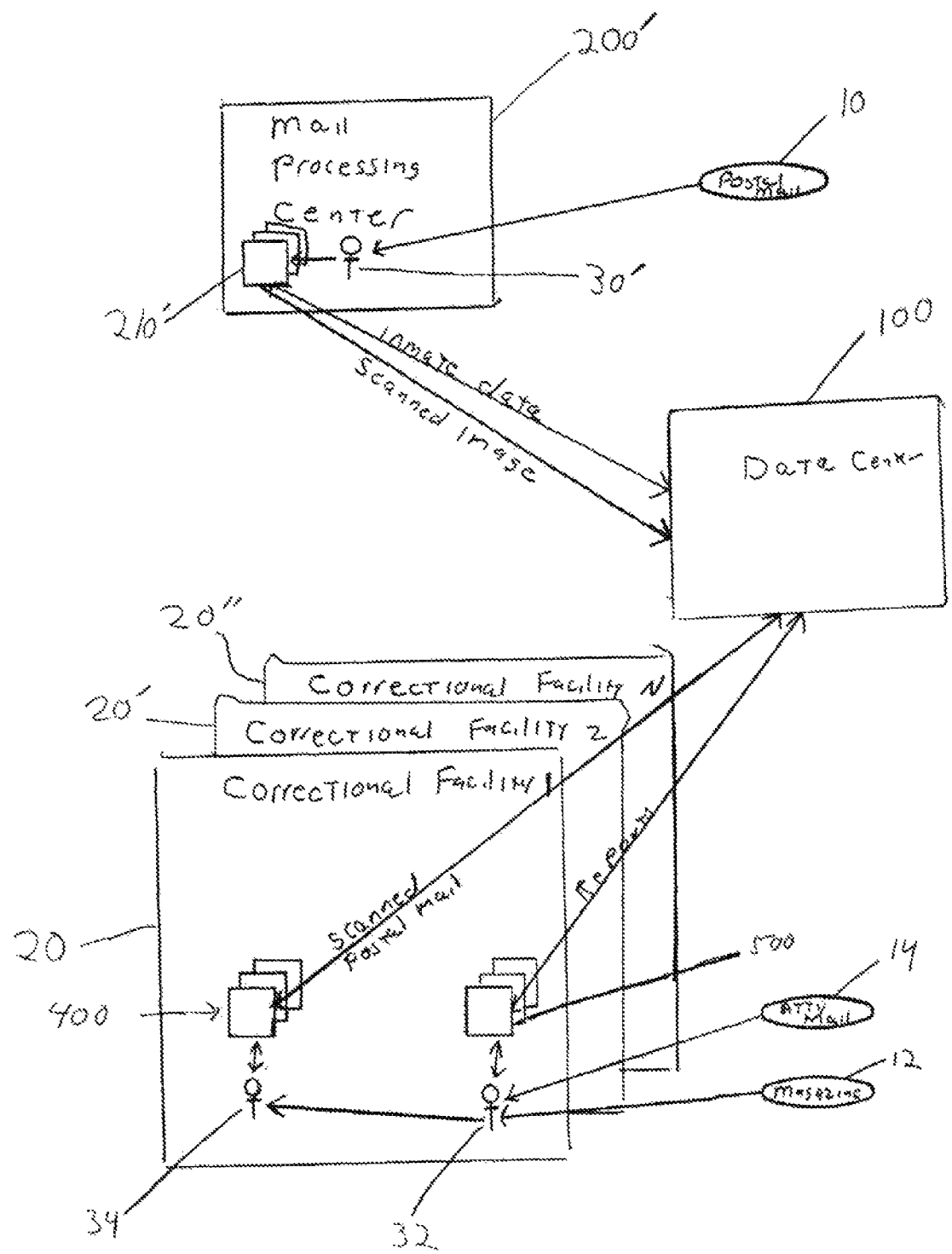
FIG. 3 illustrates a block diagram of an embodiment of a method and system in accordance with certain embodiments of the invention, in which at least a portion of postal mail processing occurs at a central mail processing center capable of serving a plurality of correctional facilities.

Referring to FIG. 3, embodiments according to the present disclosure my utilize a single mail processing center 200 that receives postal mail 10 for one correctional facility 20 or a plurality of correctional facilities 20, 2(Y, 20". In such embodiments, institution staff 32 may receive attorney mail 14 and magazines 12 for physical delivery to inmates 34 with limited review and pre-processing. Other postal mail 10 would be received by outside mail processing center 200% in which processing staff 30 would receive and process postal mail 10, perhaps for a plurality of correctional facilities. Scanning station(s) 2 IOC would be used to create scanned images of postal mail 10 and upload them to a system in data center 1003 which may be physically within mail processing center 200', or remote from it, or cloud based. Certain steps of the processing within mail processing center 200! are illustrated in FIG. 4, with example displays shown in FIGS. 5-11.

Figure 4:
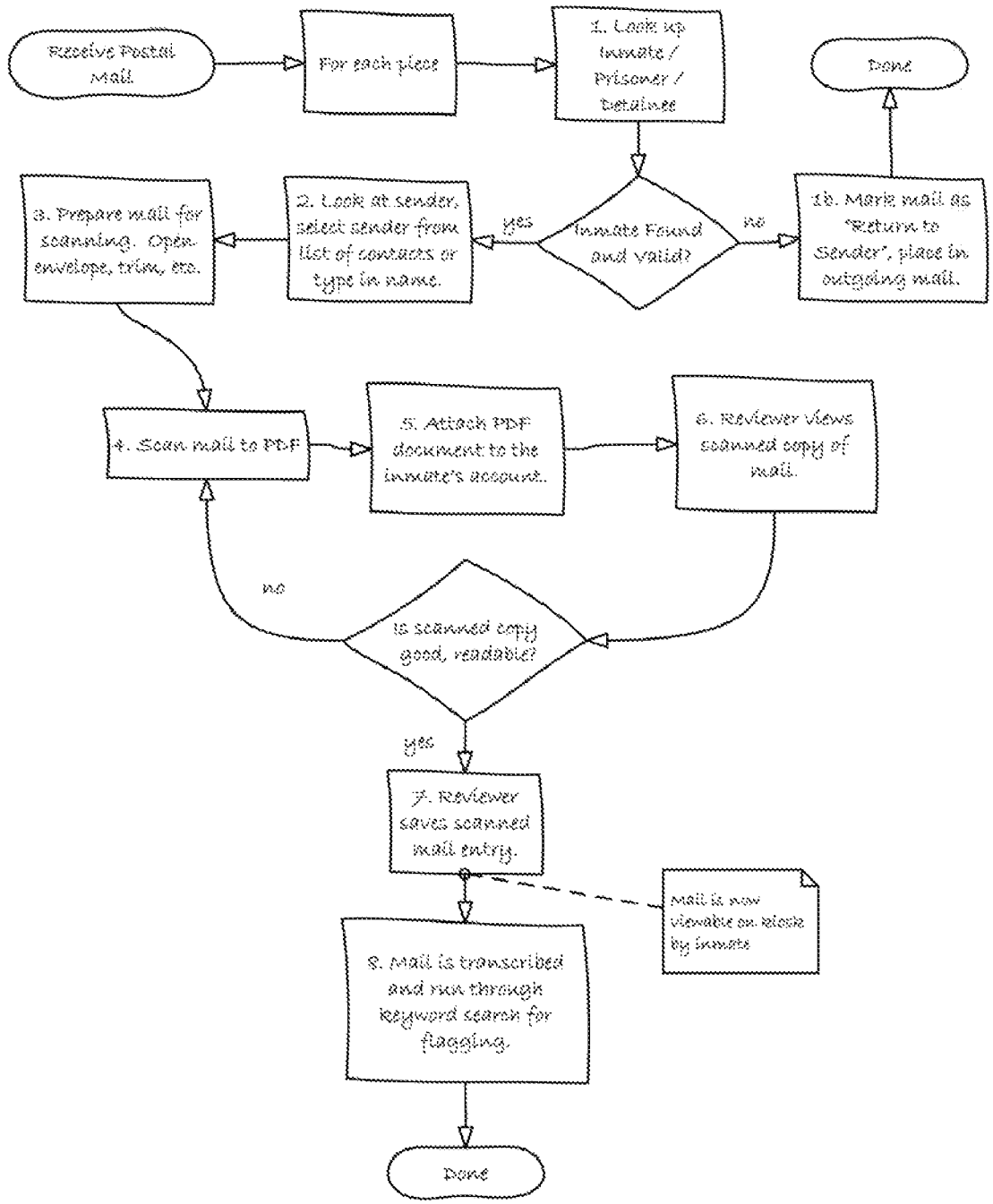
FIG. 4 is a flowchart showing certain steps that may conveniently be carried out in the mail processing centers illustrated in FIGS. 2 and 3 in connection with certain embodiments of methods and systems of the invention.
Figure 5:
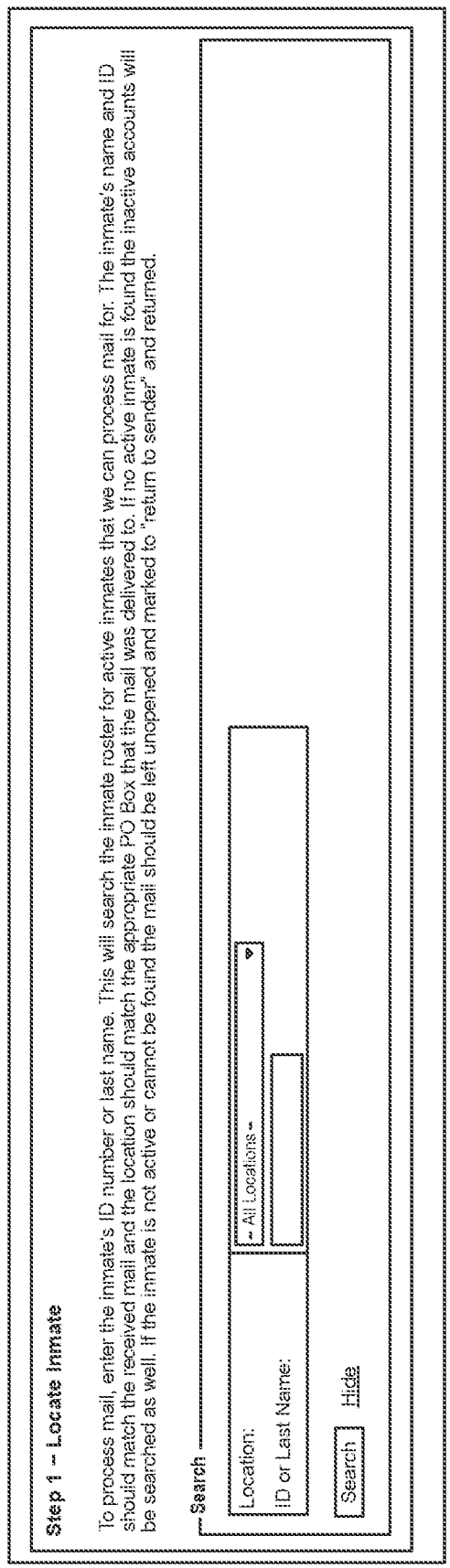
FIG. 5 illustrates a display that may conveniently be used in connection with steps illustrated in FIG. 4 and suitable for use in with certain embodiments of methods and systems according to the present invention.
Figure 6:
FIG. 6 illustrates a display that may conveniently be used in connection with steps illustrated in FIG. 4 and suitable for use in with certain embodiments of methods and systems according to the present invention.

As illustrated in step I of FIG. 4, and via the sample display in FIG. 5, when a piece of postal mail 10 is received, it is determined if the addressee is an inmate capable of receiving scanned mail. For example, a directory of inmate email accounts may be referenced. If the addressee is not capable of receiving o mail, for example because the inmate was released or transferred prior to the date of receipt the mail is marked "return to sender" and is deposited in outgoing mail as is shown in step 1b. In some embodiments, the mail may be scanned and put into the system even if the inmate has been released. In that case, the system would convert that mail to the inmate outside of the correctional facility. In certain exemplary embodiments, the inmate may be able to log into his inmate email account from outside of the correctional facility to access email and scanned postal mail. In even further embodiments, scanned postal mail may be forwarded to third parties, such as family members. For example, where an inmate has been released for a period of time, and has left no forwarding information, the scanned postal mail may be forwarded to an attorney of record or next of kin. As is shown in FIG. 5, identifying the recipient may be accomplished by searching a name or an identification number provided by the correctional facility and previously communicated to the sender of the postal mail per facility policies. Searches may be within a facility or across all facilities. In certain embodiments, the system housed in data center 100 may allow a given inmate to have aliases. In other embodiments, policies and procedures may require the use of a standard name or the marking of the envelope with a unique identification number. Where one or more matching inmates are found, the appropriate recipient may be selected from a list as shown in FIG. 6. Selection may occur by a variety of means including by selecting the name (displayed as a hyperlink as illustrated) or through buttons, touch selection, or other selecting from a drop down or list box.

In step 2 of FIG. 4, and as shown in the example display in FIG. 7. the sender's name may be entered for tracking purposes. As illustrated, a list of prior senders may be displayed, any of which may be selected. Where the sender cannot be identified, or has not previously been entered into the system, the name and/or location, and any other information deemed appropriate for tracking, of the sender may be entered at this stage, after which the "proceed" control can be used to move to the next step.

Figure 8:
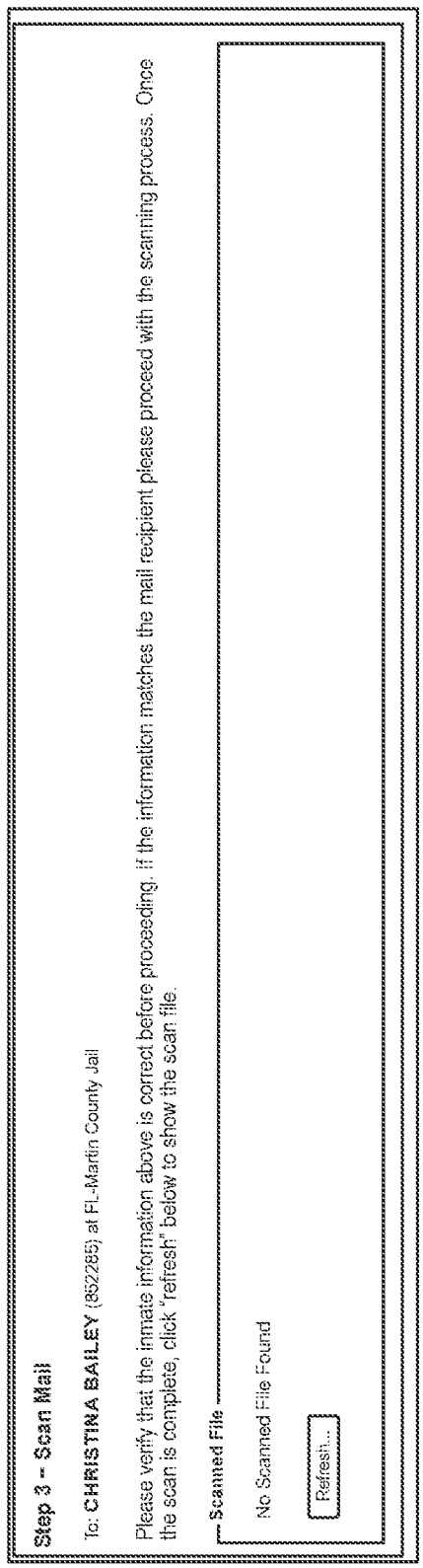
FIG. 8 illustrates a display that may conveniently be used in connection with steps illustrated in FIG. 4 and suitable for use in with certain embodiments of methods and systems according to the present invention.
Figure 11:
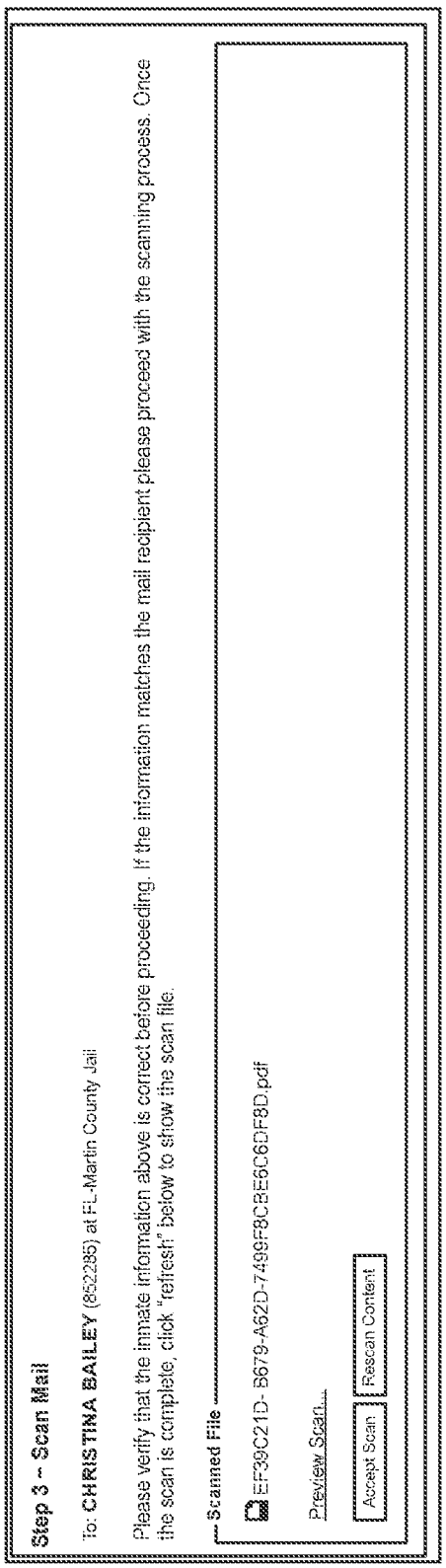
FIG. 11 is a display that may conveniently be used in connection with steps illustrated in FIG. 4 and suitable for use in with certain embodiments of methods and systems according to the present invention.

As shown in step 3 of FIG. 4 and in the example display in FIG. 8 the postal mail can then be prepared for scanning. Preparation may involve opening the envelope, initial review for obscene material, and trimming to a size suitable for scanning.

Figure 10:
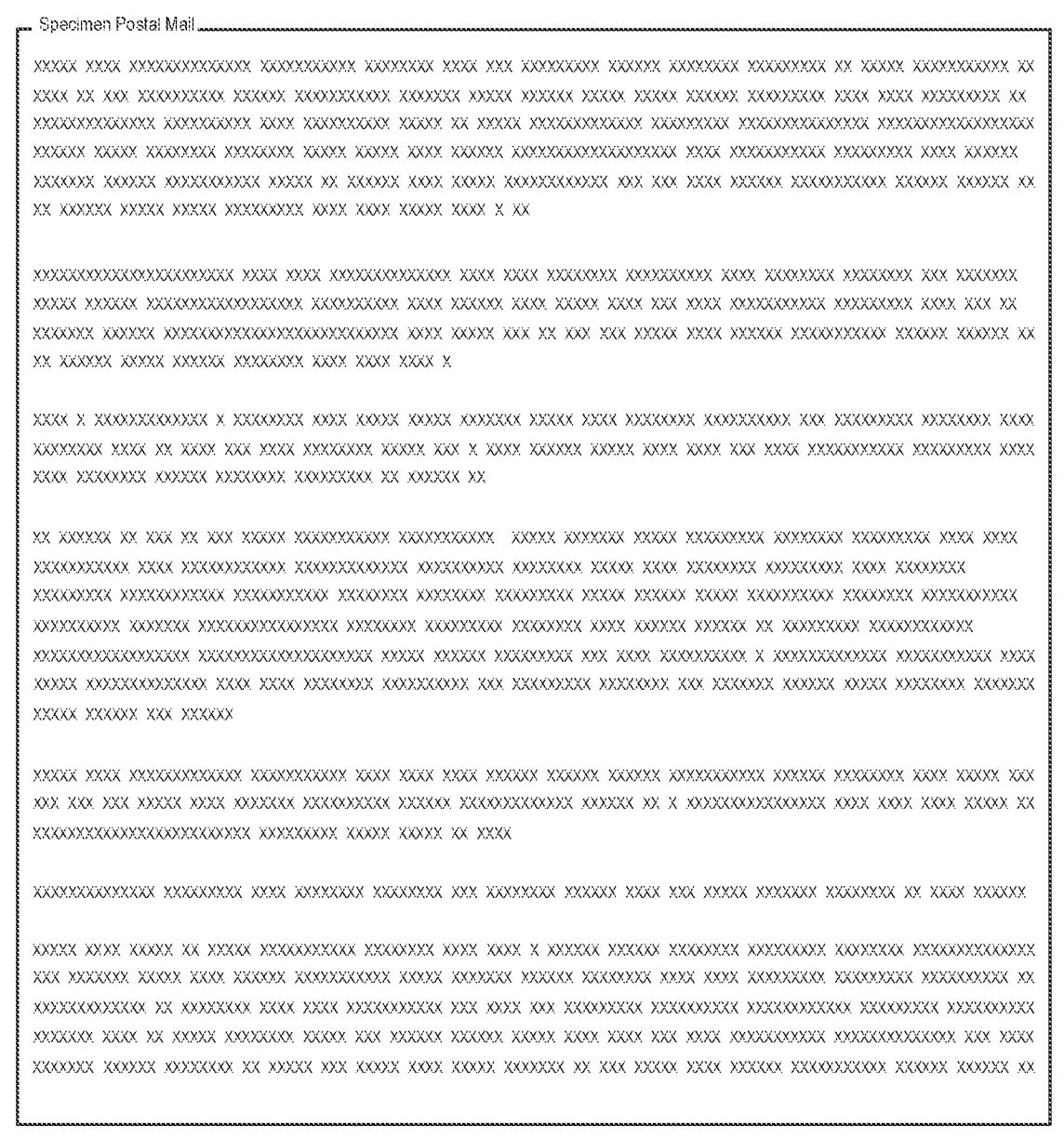
Figure 12:
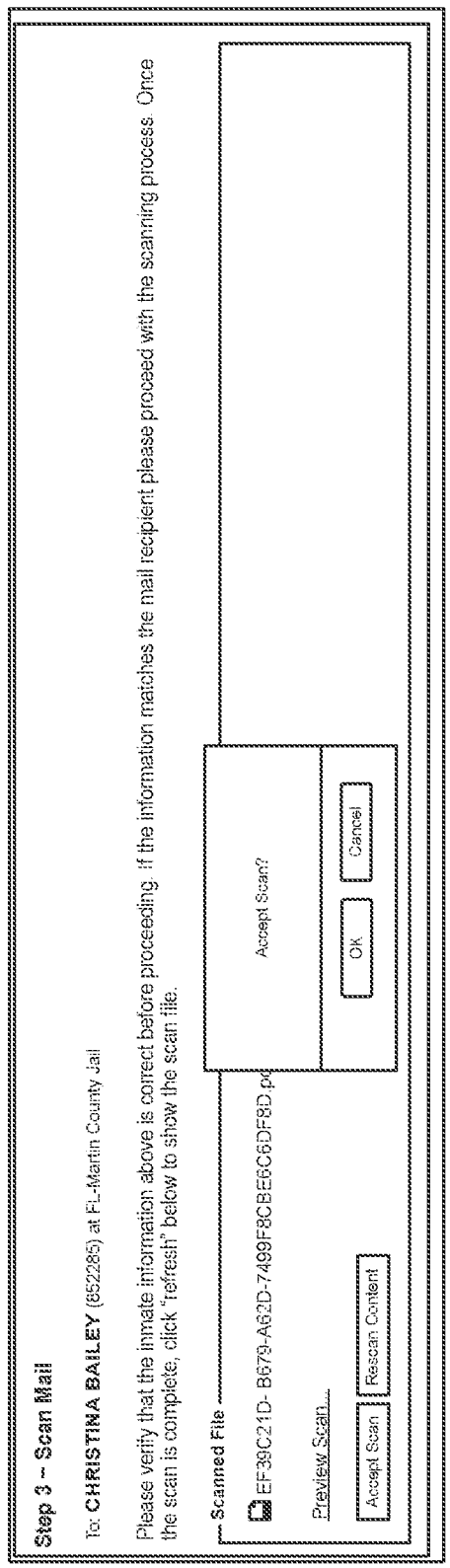
FIG. 12 illustrates a display that may conveniently be used in connection with steps illustrated in FIG. 4 and suitable for use in with certain embodiments of methods and systems according to the present invention.

As shown in step 4 of FIG. 4 and illustrated in the example display in FIG. 9, scanning may then be accomplished. This can be done in any variety of ways including by placing a scan control on the screen (not illustrated), or by utilizing the interface of the scanner itself (not illustrated). The scanner may be a network device or may be connected to the workstation being used. The scanner will then assign a unique identifier to the file scanned (preferably a GUID to avoid duplication among scanners). and present it as pdf file. Clicking a "preview scan" link or similar control can cause a copy of the scanned image (as shown in FIG. 10) to be displayed. This allows the worker to associate the image with the inmates account (step 5) and review the scanned copy for legibility (step 6). As is shown in the sample display illustrated in FIGS. 11 and 12, if legibility is not sufficient, a new scan can be performed either replacing or supplementing the original scan, as required by facility policies.

Once the scan is deemed acceptable further review and processing may occur, as shown in step 7 of FIG. 4. Such processing may involve one or more of redacting obscene content, manually flagging the communication for investigation. optical character recognition (to enable searching), printing to create a physical copy, forwarding to an investigative agency, or adding notes or comments for later review by investigators or institution staff or the inmate. Once the review process is complete, the scanned image is made available to the inmate as is further described below or is held for further review and release according to facility policies. Where electronic searching is desired by the facility, and optical character recognition fails to adequately read the contents, the scanned image may be manually transcribed (step 8), with a text version being associated with the scanned image by the system. Transcription and optical character recognition are optional and may be used not at all on particular messages flagged for transcription in step 73 or for all messages not amenable to optical character recognition.

Figure 13:
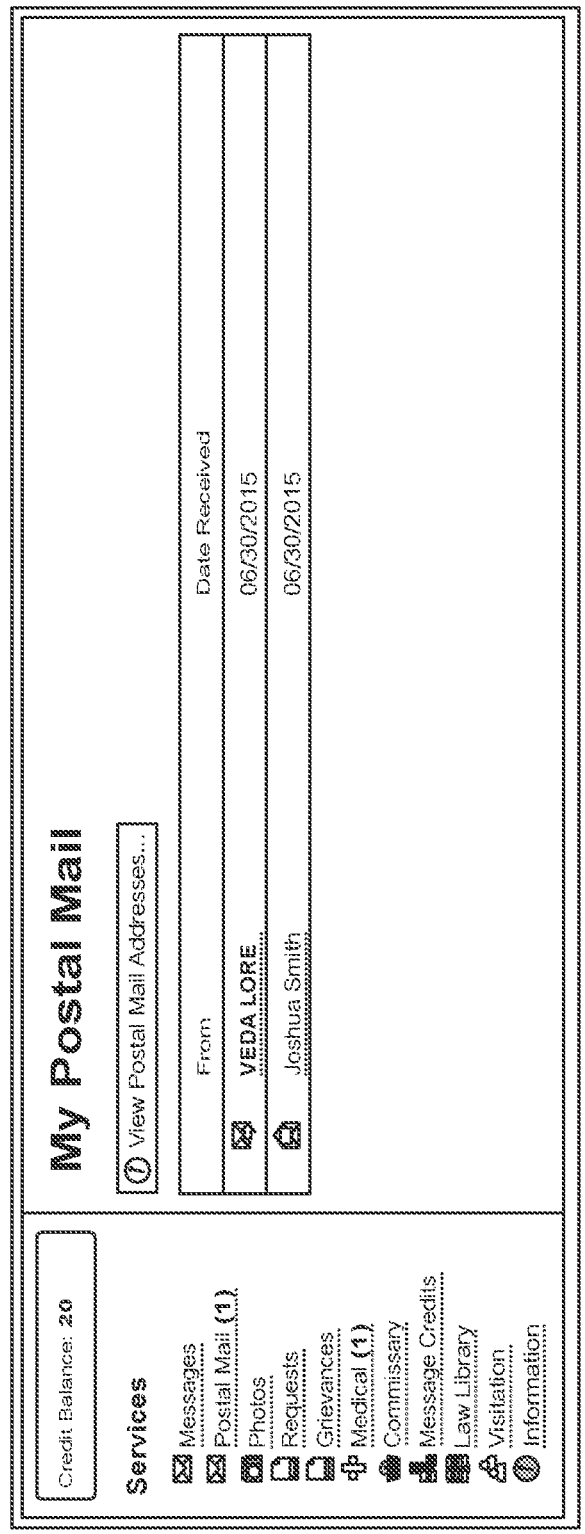
FIG. 13 illustrates a display that may conveniently be used by inmates in a correctional facility and suitable for use in with certain embodiments of methods and systems according to the present invention.
Figure 15:
FIG. 15 illustrates a third display that may conveniently be used by inmates in a correctional facility to display scanned postal mail and suitable for use in with certain embodiments of methods and systems according to the present invention.

FIG. 13 illustrates an example display that an inmate 34 would see on a computer terminal 400 when a scanned image of postal mail 10 is delivered electronically. In the illustrated embodiment, postal mail delivery is combined with other features of an inmate kiosk including email capability, photo delivery, requests to facility administration, grievances, etc. When Postal Mail is selected, a list of scanned postal mail 10 is provided, with icons and type face being used to indicate if the message has been read. As illustrated, the control View Postal Mail Addresses is provided to enable the inmate 34 to see the addresses to which postal mail may be sent. Activating that control, in the illustrated embodiment, takes the inmate to the example display illustrated in FIG. 14. As has been noted above, certain postal mail (including attorney mail 14 magazines 12, books (not shown) and other approved parcels (not illustrated)) may not be amenable to electronic delivery and, therefore, are more conveniently sent to the facility in which inmate 34 is housed. The illustrated example screen provides instructions explaining the addresses to which different types of postal mail should be sent according to facility policy.

Figure 16:
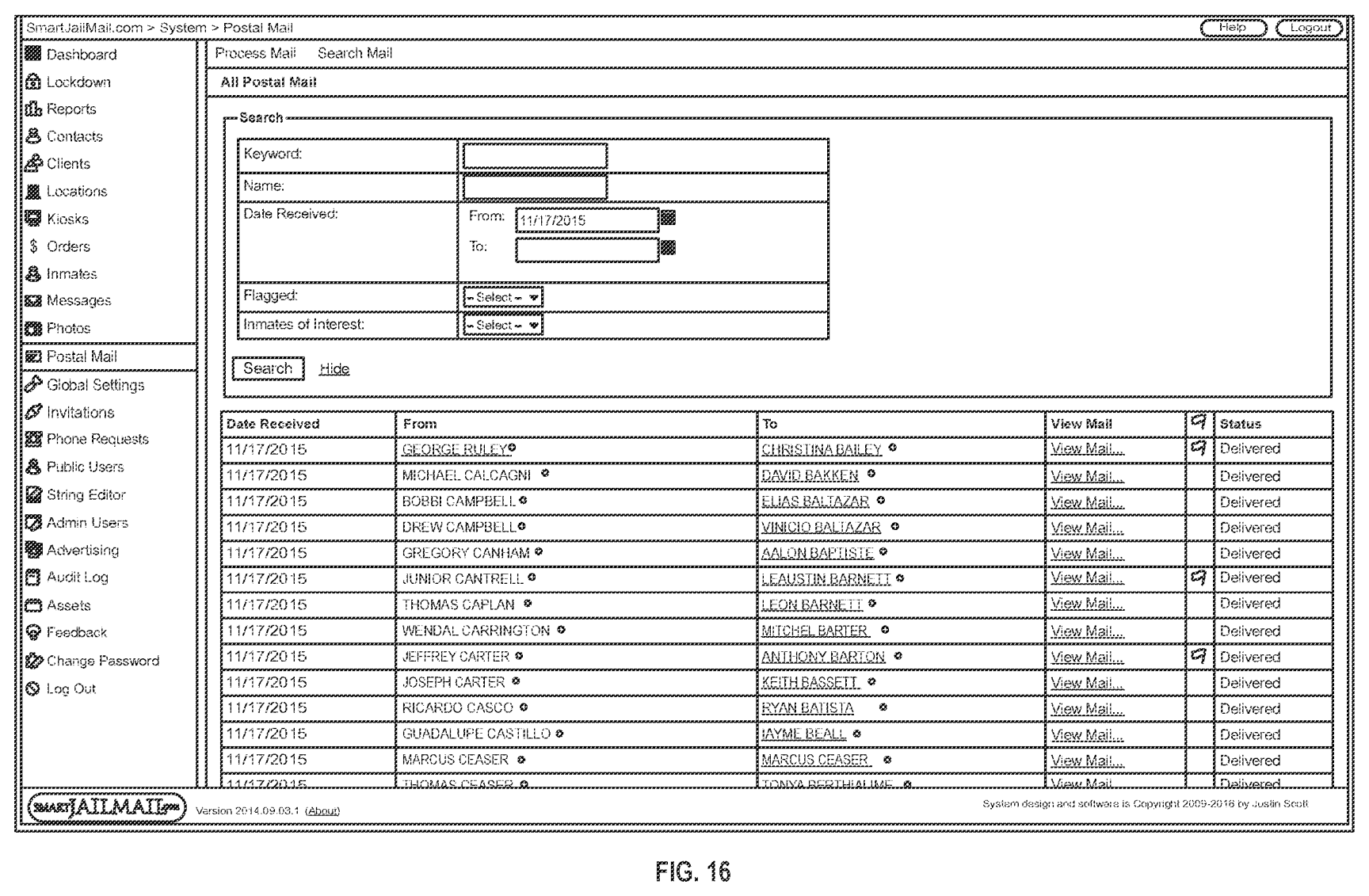

Referring again to FIG. 13, if an item of postal mail 10 is selected by selecting the hyperlink in the "From" column or the icon next to the hyperlink. the scanned version of postal mail 10 can be displayed to the inmate 34 (with redactions if applicable). FIG. 16 illustrates an example display showing a scanned version of postal mail 10.

Figure 17:
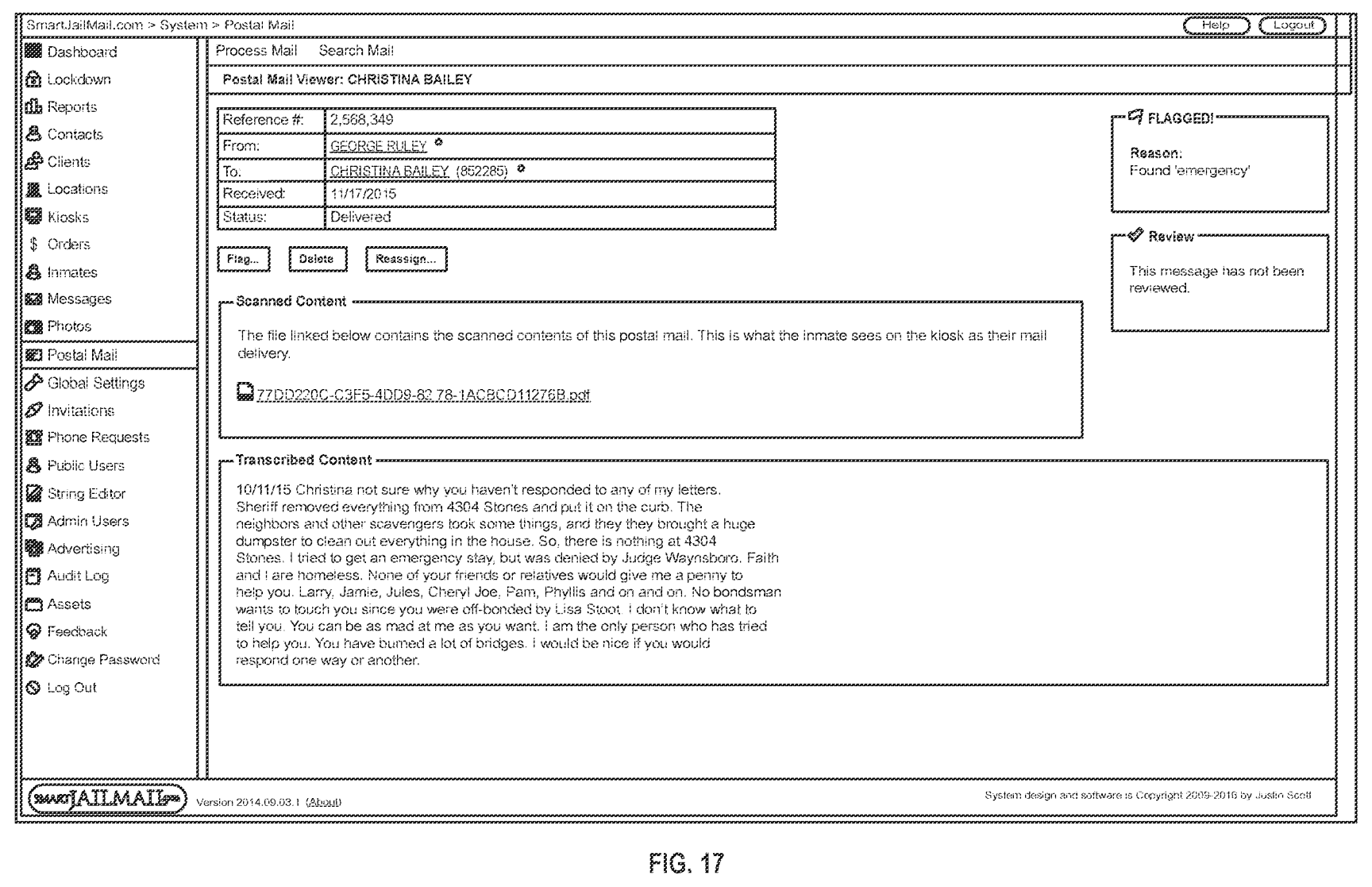

In a controlled environment such as a correctional facility, postal mail is subject to review and analysis by institution staff and, sometimes, investigative personnel. FIG. 16 shows an example display of an administrative interface intended for use by institution staff or investigators. As illustrated, the interface is integrated with the facility administrative interface for email and other inmate communication actions accessible to inmates through computer terminal 400. Selecting "Postal Mail" invokes a search interface that allows personnel to search for particular messages. Searching may conveniently be enabled by keyword (for messages that have undergone optical character recognition or transcription), name, date, recipient, sender, or any other field associated with messages. The more detail entered when the postal mail 10 is initially processed, the more search options can be presented. Flags are used to call attention to particular messages. Flags may be set manually (using predefined categories) by institution staff 32 or mail processing staff 30. Flags may also be set automatically based on analysis of the message and its metadata. Examples of automatic flagging could include flagging messages from predefined individuals or locations (e.g. cities or countries or addresses) and flagging messages based on keywords in the message body. By clicking on a message, the details of the message are shown, as illustrated on FIG. 17. In addition to the content of the message and the scanned image being made available, staff may also manually flag or reassign a message to a different inmate. Erroneous messages can also be deleted. By accessing the link to the scanned image, the message can also be printed or forwarded to another person. Each function could, in certain embodiments. also be accessed through controls made available on the message detail display. Status information, such as whether the message has been reviewed, and what flags have been attached, may also be shown, for example, on the right-hand side of the display. In certain embodiments, each step of accessing, reviewing, and updating each message can be logged in database tables or log files for auditing purposes.

Figure 18:
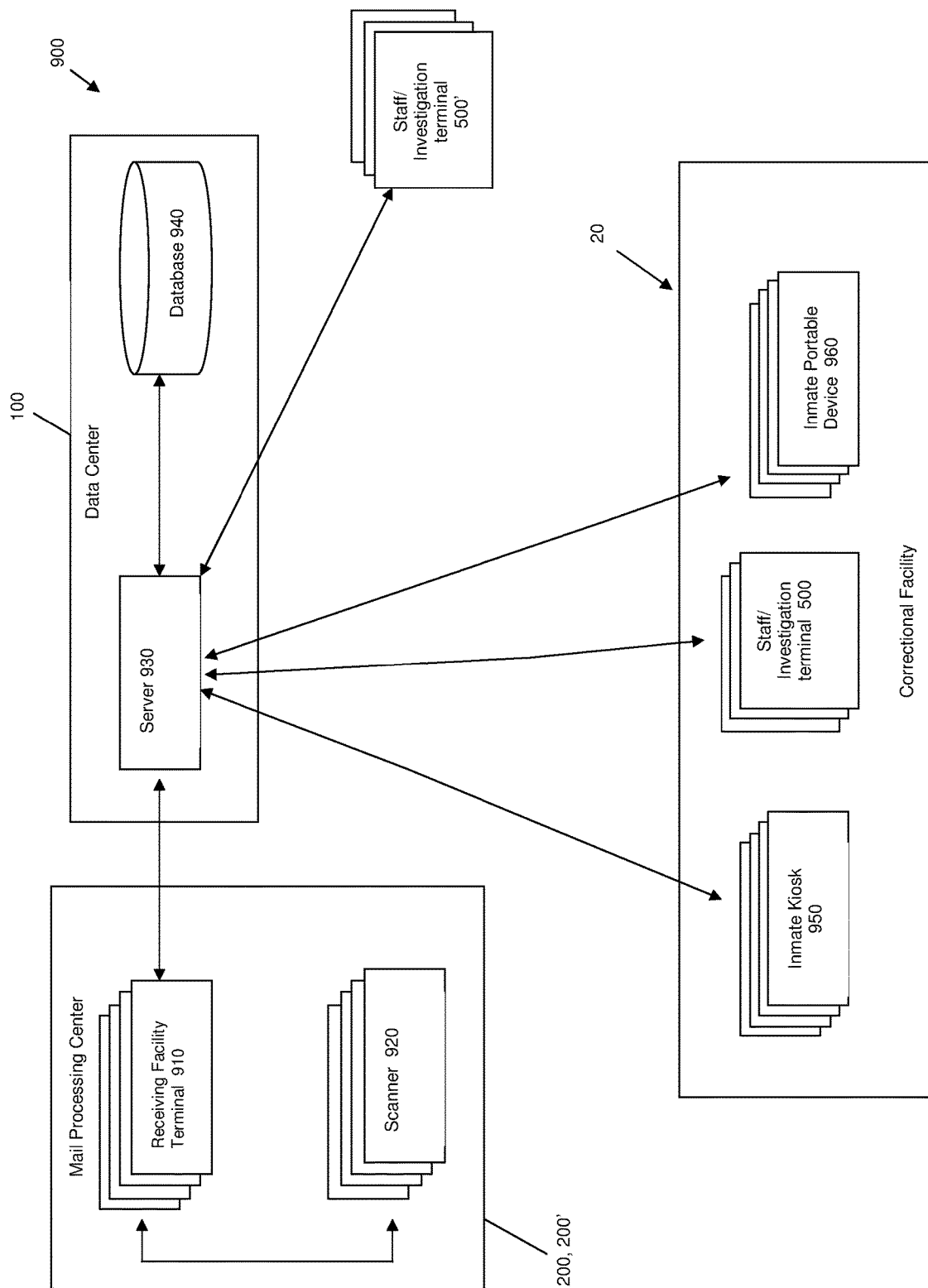
FIG. 18 is schematic representation of an architecture suitable for use with embodiments of the system and method according to the present invention consistent with FIG. 3.
Figure 1:
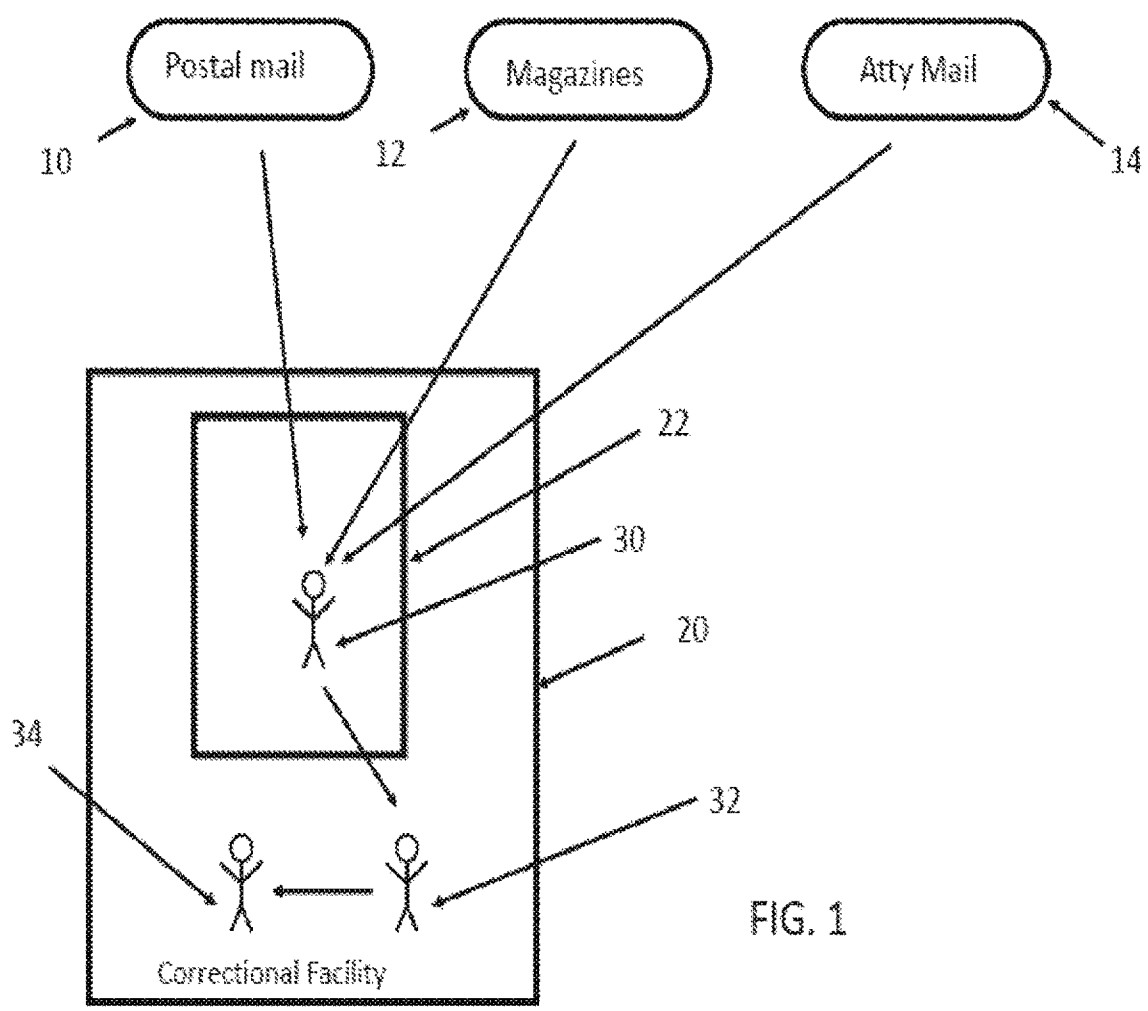
Figure 2:
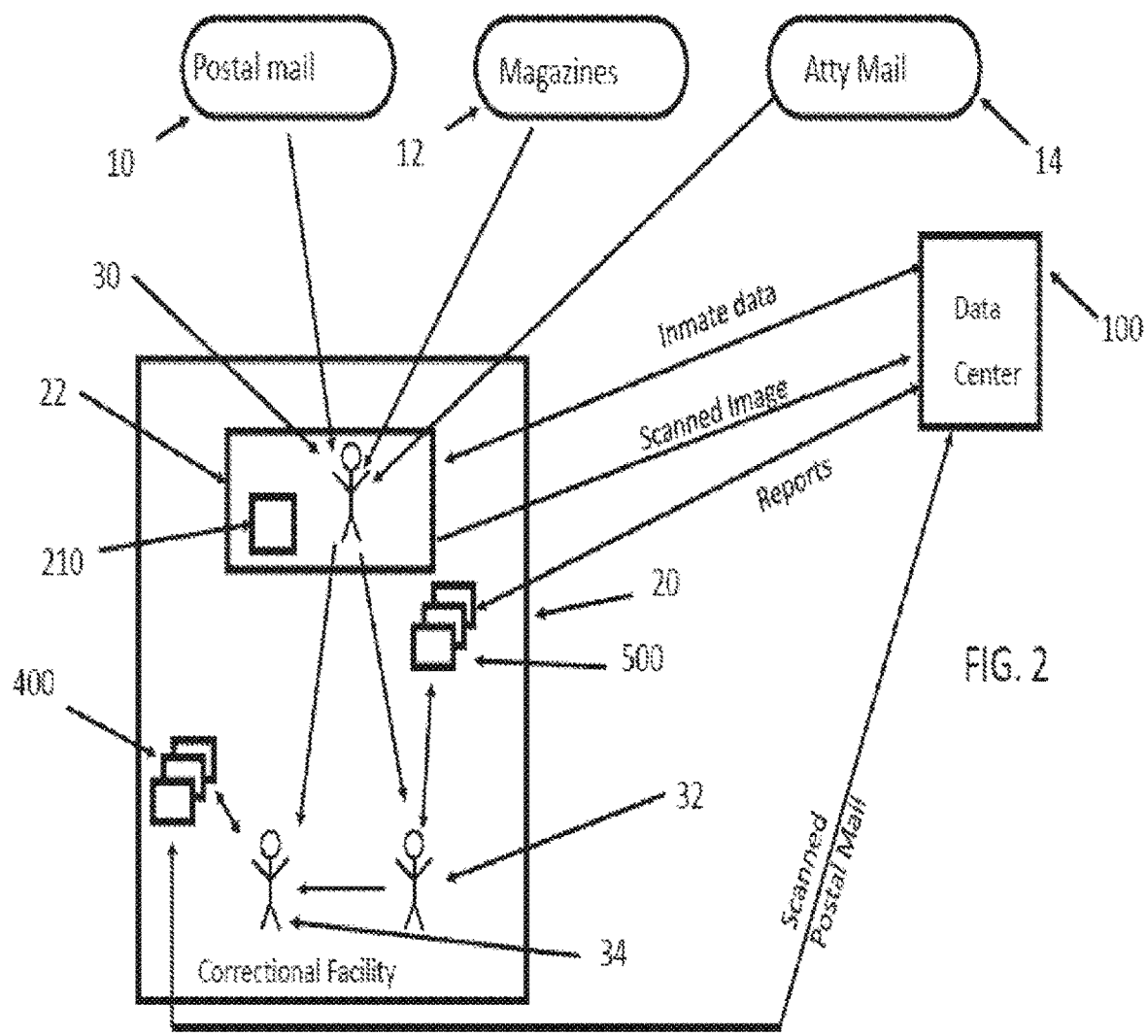
Figure 3:
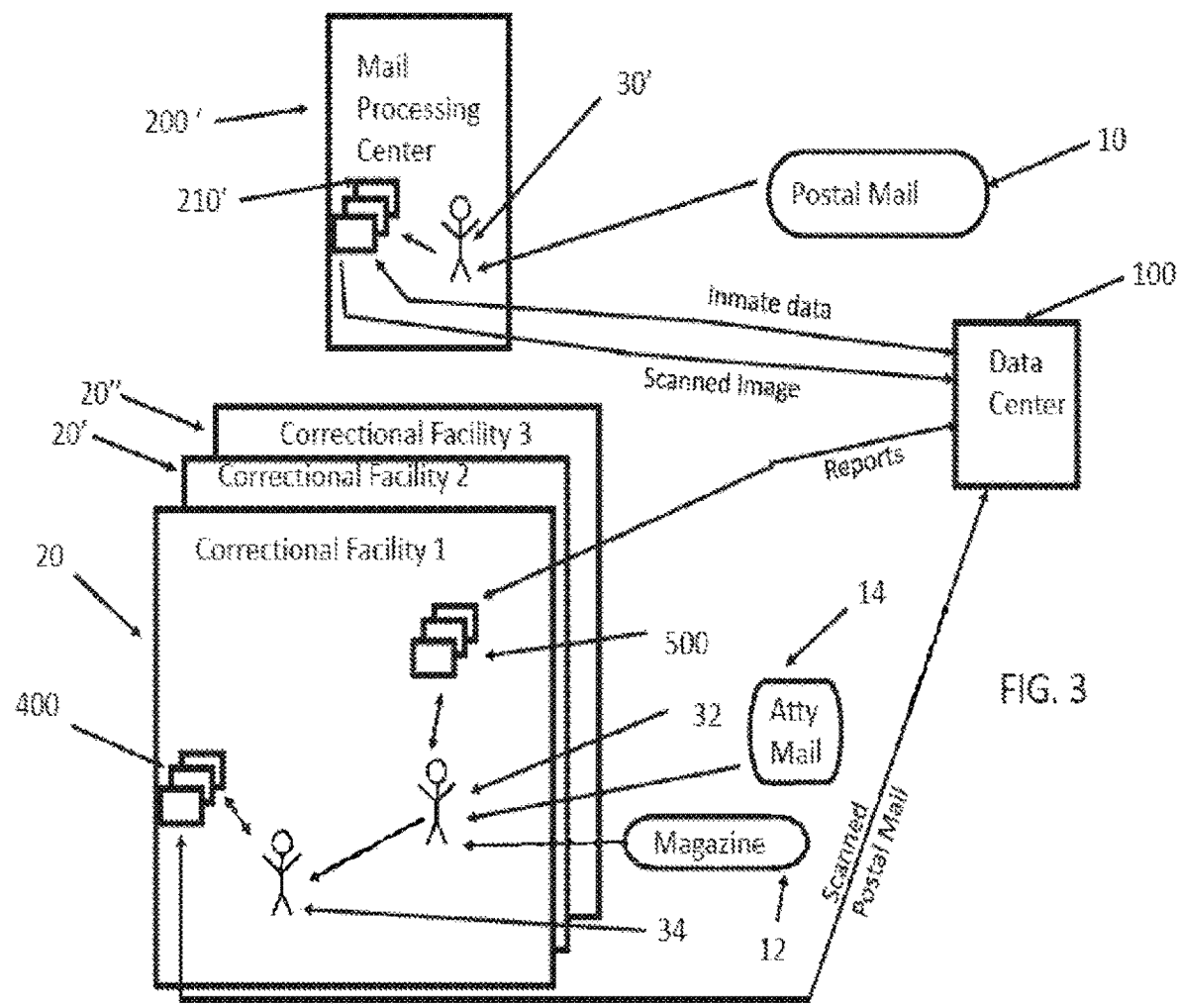
Figure 4:
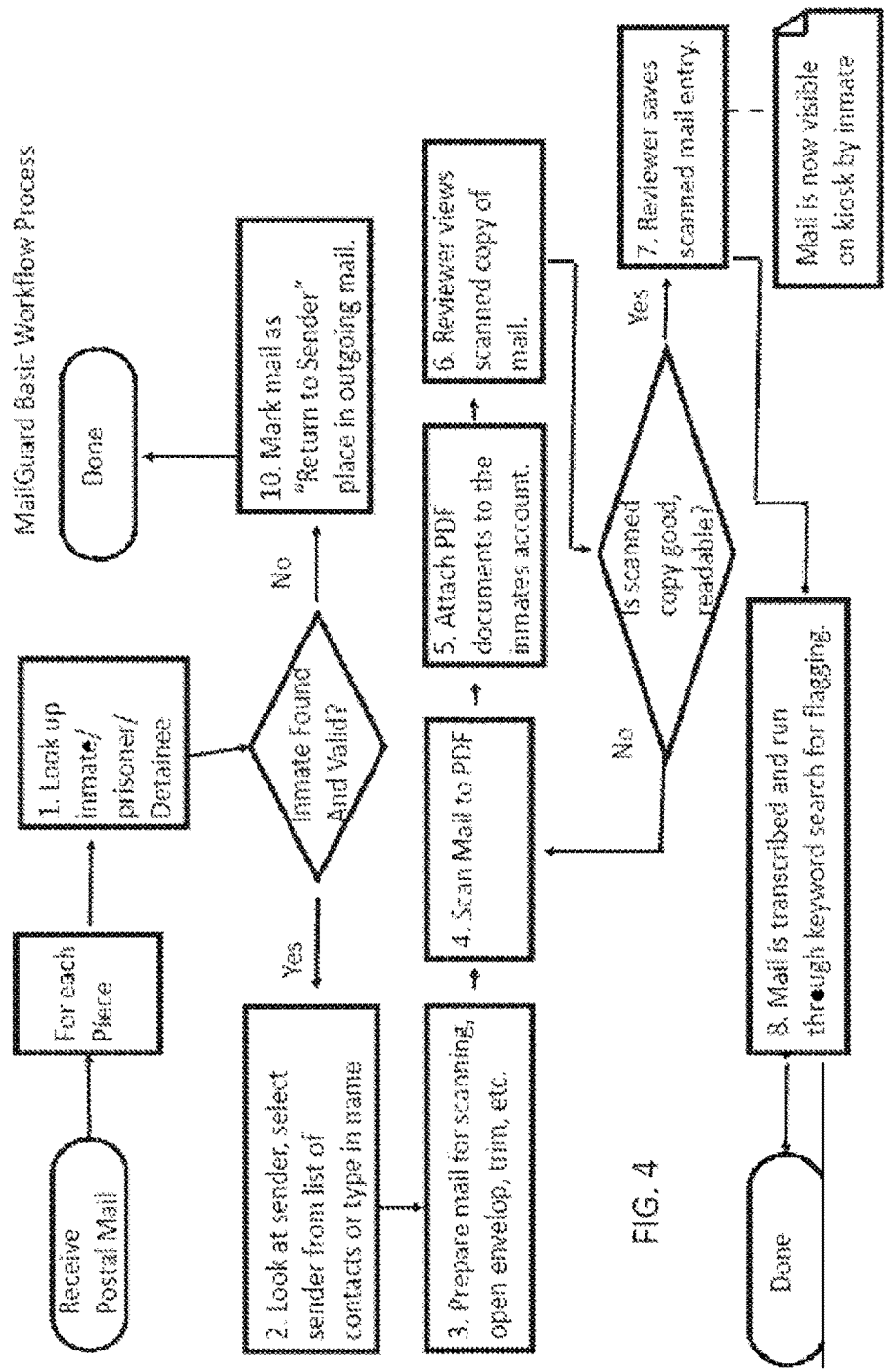

FIG. 18 illustrates a block diagram of an embodiment for postal mail 10 coming into correctional facility 20 through mail processing center 200 or 200'. Receiving facility terminal(s) 910 may be computers, tablets, or dumb terminals for use by facility personnel. Receiving facility terminal(s) 910 are connected electronically to scanner(s) 920. Scanner (s) 920 may be connected to individual receiving facility terminal(s) 910 as shown or may be on a common network (not illustrated). In certain embodiments scanner(s) 920 may be in the correctional facility and in others they may be in a remote location such as a central processing facility. In other embodiments, one or more high speed scanners (not illustrated) may be shared by multiple receiving facility terminals 910.

Receiving facility terminal(s) 910 are connected by a local area or wide area network (not shown) to one or more server 930 in a data center 100. Preferably, server 930 provides a web server that delivers the screens used by receiving facility terminal(s) 1 it should be noted that in FIGS. 2 and 3, scanner station 210, 21(Y are referenced. In FIG. 18, Receiving Facility Terminal 910 and Scanner 920 are referenced separately. It will be understood that scanner station 210, 210' shown in FIGS. 2 and 3 comprise the combination of Receiving Facility Terminal 910 and Scanner 920 illustrated in FIG. 18. Similarly, whereas FIGS. 2 and 3 refer to computer terminal 400 (which may be a variety of electronic devices used by an inmate), in the system embodiment illustrated in FIG. 18, Inmate Kiosk 950 and inmate Portable Device 960 (both of which are examples of computer terminal 400 shown in FIGS. 2 and 3) are shown separately for exemplary and discussion purposes.

910 as web pages. which may include active controls capable of controlling scanner(s) 920. Server 930 preferably is connected to database 940 which may contain records of the inmates in the correctional facility, records of postal mail processing and viewing. text indexes of electronic messages, and records of the personnel responsible for such processing. If the postal mail system is integrated with an electronic mail, video visitation or other system, a common database 940 can be used to support all features. Where electronic messages are scanned using optical character recognition, such scanning may occur on scanner(s) 920, receiving facility terminal(s) 910 or server 930. Alternatively, receiving facility terminals 910, or other remote terminals (not illustrated) may be used to allow entering of transcribed messages. As will be understood by those of skill in the art, server 930 and database 940 may be on one or more separate servers, may be on a single server, or may be on one or more of receiving facility terminal(s) 910.

Inmate kiosk(s) 950 and inmate portable device(s) 960 are electronically connected to server 930 through a local area network or wide area network, either of which may be wired or wireless. It will be understood that inmate kiosk(s) 950 and inmate portable device(s) 960 are examples of computer terminals 400 described above. Inmate kiosk(s) 950 may conveniently be the same kiosk(s) used for purposes such as email delivery, commissary ordering. video visitation, and/or other services such as the SmartKiosk is offered by Smart Communications. Alternatively, inmate kiosks 950 may be kiosks dedicated to delivery of electronic images of postal mail.

Inmate portable device(s) 960 may be portable tablets, music players, smart phones, or other portable devices used by inmates and capable of communicating with server 930 through a network connection. In certain embodiments (not illustrated) inmate portable device(s) 960 may include the ability to download messages from server 930 while connected to a network, for later viewing when not connected to the network. As discussed above, server 930 may conveniently deliver the interface to inmate kiosk(s) 950 and/or inmate portable device(s) 960 as web pages, thereby minimizing the need for custom client software. As coordination and viewing is controlled by server 930 in such embodiments, server 930 may monitor and log such accesses (either in log files or database tables as appropriate).

It will be understood by those of skill in the art that either inmate kiosk(s) 950 or inmate portable device(s) 960, or both, may be used in a single installation and that the number of each may be one or many depending on available network bandwidth and the capabilities of server 930. Some installations may thus only have a single inmate kiosk 950 or a single inmate portable device 960, while other installations have one or more of each.

As has been discussed above, there are times when it may be necessary for institution staff or outside investigators to have access to processed postal mail. In institution staff/investigator terminal(s) 500 (within the correctional facility) and outside institution staff 7 investigator terminals 500' can be used for this purpose. Such terminals may be computers, laptops, dumb terminals, virtual machines. kiosks or any other electronic device with a display and the ability to connect to server 930 through a network. Login credentials and other user identification means known in the industry (e.g. 2-step authentication biometrics, hardware identification, electronic key devices and the like) may be used to identify authorized staff and investigators and enhance system security.

While the invention has been particularly shown and described with reference to an embodiment thereof, it will be understood by those skilled in the art that various changes in form and details may be made therein without departing from the spirit and scope of the invention.

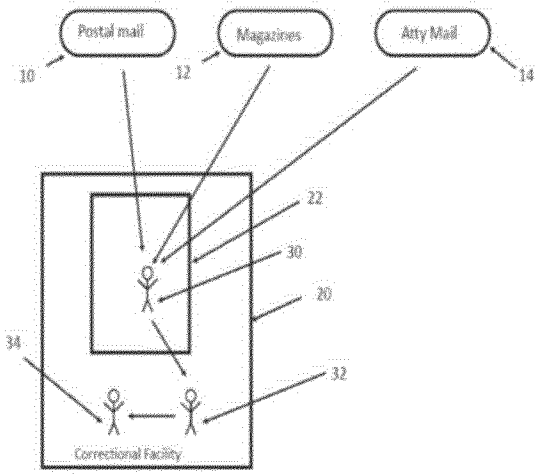

What is claimed is:

1. A method for eliminating contraband in postal mail for a correctional facility comprising:

receiving an identification of mail information associated with a postal mail that is sent to a recipient inmate, the identification of mail information comprising at least one of identification of the recipient inmate and identification of a correctional facility associated with the recipient inmate;

identifying an inmate postal mail account associated with the recipient inmate, the postal mail account being capable of electronically receiving digital messages associated with postal mail;

scanning at least a portion of the postal mail, thereby creating a digital representation of at least a portion of the postal mail;

associating the digital representation with the inmate postal mail account;

receiving a determination from staff, wherein the determination is based upon whether contraband is discovered upon screening of at least one of the postal mail and the digital representation;

electronically delivering the digital representation to the inmate postal mail account upon receiving a determination from staff representing that access is not denied, the digital representation being capable of display on a terminal capable of receiving and sending at least one of digital representation of postal mail and email; and logging access to the digital representation by the recipient inmate.

2. The method of claim 1, wherein the postal mail includes an envelope having sender information and contents having the content information.

3. The method of claim 1, wherein the postal mail includes a post card having sender information and the content information.

4. The method of claim 1, wherein screening the postal mail for a contraband includes screening the postal mail for one of a group consisting of pornography, dangerous objects, or criminal communication.

5. The method of claim 1, wherein screening the postal mail for contraband includes identifying whether a powder and another suspicious substance is present.

6. The method of claim 1, further comprising the step of generating a text searchable version of the digital representation.

7. The method of claim 6, further including the step of electronically searching the content information of the text searchable version of the digital representation, wherein a flag may be set and the recipient inmate's access to the digital representation may be denied based on the presence of pre-defined keywords.

8. The method of claim 6, further including the step of electronically searching for sender information within the text searchable version of the digital representation, wherein a flag may be set and the recipient inmate's access to the digital representation may be denied based on the identification of a certain sender.

9. The method of claim 1, wherein the terminal is a portable device.

10. The method of claim 1, wherein the terminal is a standalone kiosk in a shared access area of a correctional facility.

11. The method of claim 1, further comprising the step of providing the recipient inmate an option to forward the digital representation to a party outside of the recipient inmate's institution.

12. The method of claim 1, further comprising the step of providing access to the digital representation from outside of the recipient inmate's institution wherein the recipient inmate may access the electronic copy after being released from the correctional institution.

13. The method of claim 1, further comprising pre-screening sender information to identify whether the postal mail is from legal counsel or otherwise qualifies as legal mail.

14. The method of claim 1, further including the step of forwarding the postal mail to the institution housing the recipient inmate.

15. The method of claim 1, further including the step of the institution staff printing the digital representation and delivering the printed copy to the recipient inmate.

16. The method of claim 1, wherein the recipient inmate may view the digital_representation on the terminal by accessing the inmate postal mail account.

17. The method of claim 1, wherein the digital representation of the postal mail to an inmate is comprised of a digital image of at least a portion of contents of the postal_mail.

18. The method of claim 17, wherein the digital representation of the postal_mail to an inmate is further comprised of a digital image of envelope that is used to enclose the contents of the postal mail.

19. The method claim 1, wherein the digital representation of the postal mail to an inmate is comprised of a text-readable digital data representing contents of the postal mail.

20. The system method_of claim 19, wherein the digital representation of the postal_mail to an inmate is further comprised of a digital image of envelope that is used to enclose the contents of the postal mail.

21. The method of claim 1, wherein the digital representation of the postal mail to an inmate is comprised of a digital image of contents of the postal mail.

22. The method of claim 1, wherein the digital representation is displayed on a terminal capable of receiving email.

23. A system for processing postal mail that is sent to an inmate at a corrections facility, the system comprising: one or more processors; and one or more computer-readable non-transitory storage media coupled to one or more of the processors and_comprising instructions operable when executed by one or more of the processors to cause the system to:
receive an identification of mail information associated with a postal mail that is sent_to a recipient inmate, the identification of mail information comprising at least one of identification of the recipient inmate and identification of the correctional facility associated with the recipient inmate;
identify a postal mail account associated with the recipient inmate, the postal mail_account being capable of electronically receiving digital messages associated with postal mail;
scan at least a portion of the postal mail, thereby creating a digital representation of at_least a portion of the postal mail;
associate the digital representation with the inmate postal mail account;
receive a determination from staff, wherein the determination is based upon whether_contraband is discovered upon screening of at least one of the postal mail and the digital representation;
electronically deliver the digital representation to the inmate postal mail account upon_receiving a determination from staff representing that access is not denied, the dispatched digital representation being capable of display on a terminal capable of_receiving and sending_at least one of digital representation of postal mail and email; and
log access to the digital representation by_the recipient inmate.

24. The system of claim 23, wherein screening the postal mail for a contraband includes screening the postal mail for one of a group consisting_of pornography, dangerous objects, or criminal communication.

25. The system of claim 23, wherein the recipient inmate may view the digital representation on the terminal by accessing the inmate postal mail account.

26. The system of claim 23, wherein the digital representation of the postal mail to an inmate is comprised of a digital image of at least a portion of contents of the postal mail.

27. The system of claim 23, wherein the digital representation is displayed on a terminal capable of receiving email.

28. The system of claim 23, wherein the institution staff is enabled to print the digital representation and deliver the printed copy to the recipient inmate.

29. A computer program product for processing communication that is sent_to an inmate at a corrections facility, the computer program product comprising a non-transitory computer readable storage medium having instructions encoded thereon that, when_executed by a processor, cause the processor to:
receive an identification of mail information associated with a postal mail that is sent_to a recipient inmate, the identification of mail information comprising at least one of identification of the recipient inmate and identification of the correctional facility associated_with the recipient inmate;
identify a postal mail account associated with the recipient inmate, the postal mail_account being capable of electronically receiving digital messages associated with postal mail;
scan at least a portion of the postal mail, thereby creating a digital representation of at_least a portion of the postal mail associate the digital representation with the inmate postal mail account;
receive a determination from staff, wherein the determination is based upon whether_contraband is discovered upon screening of at least one of the postal mail and the digital representation;
electronically deliver the digital representation to the inmate postal mail account upon_receiving a determination from staff representing that access is not denied, the digital representation being capable of display on a terminal capable of receiving and sending_at least one of digital representation of postal mail and email; and
log access to the digital representation by_the recipient inmate.

30. The computer program product of claim 29, wherein screening the postal mail for a contraband includes screening the postal mail for one of a group consisting_of pornography, dangerous objects, or criminal communication.

31. The computer program product of claim 29, wherein the recipient inmate may view the digital representation on the terminal by accessing the inmate postal mail account.

32. The computer program product of claim 29, wherein the institution staff is enabled to print the digital representation and deliver the printed copy to the recipient inmate.

* * * * *

UNITED STATES PATENT AND TRADEMARK OFFICE
CERTIFICATE OF CORRECTION

| | |
|---|---|
| PATENT NO. | : 11,457,013 B2 |
| APPLICATION NO. | : 16/409084 |
| DATED | : September 27, 2022 |
| INVENTOR(S) | : Jonathan D. Logan |

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace FIGS. 1-4 with FIGS. 1-4 as shown on the attached pages.

In the Claims

Column 13, Line 14, delete "may view the digital_representation on the terminal by", and insert therefor --may view the digital representation on the terminal by--;

Column 13, Line 18, delete "image of at least a portion of the contents of the postal_mail.", and insert therefor --image of at least a portion of the contents of the postal mail.--;

Column 13, Line 20, delete "sentation of the postal_mail to an inmate is further com-", and insert therefor --sentation of the postal mail to an inmate is further com--;

Column 13, Lines 27 and 28, delete "The system method_of claim 19, wherein the digital representation of the postal_mail to an inmate is further", and insert therefor --The system method of claim 19, wherein the digital representation of the postal mail to an inmate is further--;

Column 13, Line 40, delete "processors and_comprising instructions operable when", and insert therefor --processors and comprising instructions operable when--;

Column 13, Line 44, delete "with a postal mail that is sent_to a recipient inmate, the", and insert therefor --with a postal mail that is sent to a recipient inmate, the--;

Signed and Sealed this
Fifteenth Day of August, 2023

*Katherine Kelly Vidal*
Katherine Kelly Vidal
*Director of the United States Patent and Trademark Office*

Column 13, Line 50, delete "ent inmate, the postal mail_account being capable of", and insert therefor --ent inmate, the postal mail account being capable of--;

Column 13, Line 54, delete "a digital representation of at_least a portion of the", and insert therefor --a digital representation of at least a portion of the--;

Column 13, Line 59, delete "nation is based upon whether_contraband is discovered", and insert therefor --nation is based upon whether contraband is discovered--;

Column 13, Line 63, delete "inmate postal mail account upon_receiving a determi-", and insert therefor --inmate postal mail account upon receiving a determi- --;

Column 14, Lines 2 and 3, delete "display on a terminal capable of_receiving and sending_at least one of digital representation of postal mail", and insert therefor --display on a terminal capable of receiving and sending at least one of digital representation of postal mail--;

Column 14, Line 5, delete "log access to the digital representation by_the recipient", and insert therefor --log access to the digital representation by the recipient--;

Column 14, Line 9, delete "one of a group consisting_of pornography, dangerous", and insert therefor --one of a group consisting of pornography, dangerous--;

Column 14, Line 23, delete "nication that is sent_to an inmate at a corrections facility, the", and insert therefor --nication that is sent to an inmate at a corrections facility, the--;

Column 14, Line 26, delete "encoded thereon that, when_executed by a processor, cause", and insert therefor --encoded thereon that, when executed by a processor, cause--;

Column 14, Line 29, delete "with a postal mail that is sent_to a recipient inmate, the", and insert therefor --with a postal mail that is sent to a recipient inmate, the--;

Column 14, Line 32, delete "tification of the correctional facility associated_with", and insert therefor --tification of the correctional facility associated with--;

Column 14, Line 35, delete "ent inmate, the postal mail_account being capable of", and insert therefor --ent inmate, the postal mail account being capable of--;

Column 14, Line 39, delete "a digital representation of at_least a portion of the", and insert therefor --a digital representation of at least a portion of the--;

Column 14, Line 40, delete "postal mail associate the digital representation with the", and insert therefor --postal mail associated with the digital representation of the--;

Column 14, Line 43, delete "nation is based upon whether_contraband is discovered", and insert therefor --nation is based upon whether contraband is discovered--;

CERTIFICATE OF CORRECTION (continued)
U.S. Pat. No. 11,457,013 B2

Column 14, Line 47, delete "inmate postal mail account upon_receiving a determi-", and insert therefor --inmate postal mail account upon receiving a determi- --;

Column 14, Line 50, delete "terminal capable of receiving and sending_at least one", and insert therefor --terminal capable of receiving and sending at least one--;

Column 14, Line 52, delete "log access to the digital representation by_the recipient", and insert therefor --log access to the digital representation by the recipient--;

Column 14, Line 56, delete "ing the postal mail for one of a group consisting_of por-", and insert therefor --ing the postal mail for one of a group consisting of por- --.

(12) United States Patent
Logan

(10) Patent No.: US 11,457,013 B2
(45) Date of Patent: *Sep. 27, 2022

(54) CORRECTIONAL POSTAL MAIL CONTRABAND ELIMINATION SYSTEM

(71) Applicant: HLFIP HOLDING, INC., Placida, FL (US)

(72) Inventor: Jonathan D. Logan, Tampa, FL (US)

(73) Assignee: HLFIP HOLDING, INC., Placida, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/409,084

(22) Filed: May 10, 2019

(65) Prior Publication Data

US 2020/0128014 A1    Apr. 23, 2020

Related U.S. Application Data

(63) Continuation of application No. 15/153,171, filed on May 12, 2016, now Pat. No. 10,291,617.

(60) Provisional application No. 62/286,046, filed on Jan. 22, 2016, provisional application No. 62/160,054, filed on May 12, 2015.

(51) Int. Cl.
*G06K 15/00* (2006.01)
*H04L 9/40* (2022.01)
*H04L 51/08* (2022.01)
*G06V 30/40* (2022.01)
*G06V 30/148* (2022.01)
*H04L 51/212* (2022.01)

(52) U.S. Cl.
CPC ........... *H04L 63/10* (2013.01); *G06V 30/153* (2022.01); *G06V 30/40* (2022.01); *H04L 51/08* (2013.01); *H04L 51/212* (2022.05); *H04L 63/0245* (2013.01)

(58) Field of Classification Search
CPC ..... H04L 63/10; H04L 63/0245; H04L 51/12; H04L 51/08; G06K 9/00442; G06K 9/344
USPC .................................................... 726/4
See application file for complete search history.

(56) References Cited

U.S. PATENT DOCUMENTS 5,917,925 A   6/1999 Moore
6,285,777 B2  9/2001 Kanevsky et al.
(Continued)

OTHER PUBLICATIONS

6 Services to Send and Receive Snail Mail Through the Web; http://www.instantfundas.com/2008/04/6-services-to-send-and-receive-snail.html 12/3112008.
(Continued)

*Primary Examiner* — Jeffrey C Pwu
*Assistant Examiner* — Nega Woldemariam
(74) *Attorney, Agent, or Firm* — Shah IP Law, PLLC

(57) ABSTRACT

A method and system for eliminating contraband in postal mail at a correctional facility comprising a central processing facility and a network of inmate email kiosks and correctional institution staff review stations. The postal mail utilizes scanning stations to create electronic versions of the mail and associates various information about the sender, recipient, mail contents, and institution into a format that is easily reviewable and provides tracking data. The scanned mail may then be made available to the intended inmate and institution staff. Institution staff may also then access the associated information and tracking data.

32 Claims, 18 Drawing Sheets